US007516254B2

(12) United States Patent
Nanki et al.

(10) Patent No.: US 7,516,254 B2
(45) Date of Patent: Apr. 7, 2009

(54) MEMORY CONTROL APPARATUS

(75) Inventors: Hidenori Nanki, Osaka (JP); Yoshiteru Mino, Osaka (JP); Keizo Sumida, Osaka (JP)

(73) Assignee: Panasonic Corporation

( * ) Notice: Subject to any disclaimer, the term of this patent is extended or adjusted under 35 U.S.C. 154(b) by 235 days.

(21) Appl. No.: 11/470,742

(22) Filed: Sep. 7, 2006

(65) Prior Publication Data
US 2007/0088855 A1  Apr. 19, 2007

(30) Foreign Application Priority Data
Sep. 16, 2005  (JP) ............................. 2005-271033

(51) Int. Cl.
*G06F 5/00* (2006.01)
*G06F 13/28* (2006.01)
(52) U.S. Cl. .......................................... 710/52; 710/22
(58) Field of Classification Search .................. 710/22, 710/52
See application file for complete search history.

(56) References Cited

U.S. PATENT DOCUMENTS 4,800,440 A * 1/1989 Kurokawa .................... 382/246
5,953,538 A * 9/1999 Duncan et al. ................ 710/22
6,886,072 B2   4/2005 Saruwatari et al.
2003/0181994 A1  9/2003 Mizoguchi

FOREIGN PATENT DOCUMENTS

JP     6-243037     9/1994

OTHER PUBLICATIONS

English Language Abstract of JP 6-243037, Feb. 9, 1994.

* cited by examiner

*Primary Examiner*—Niketa I Patel
*Assistant Examiner*—Juanito C Borromeo
(74) *Attorney, Agent, or Firm*—Greenblum & Bernstein, P.L.C.

(57) ABSTRACT

A memory control apparatus is capable of surely becoming consistent with an external memory while avoiding a deterioration in access efficiency to the external memory. The memory control apparatus includes: a data buffer and an address buffer which respectively store data and addresses related to past access requests from a first master; a first comparison unit which compares a new address with the address of the address buffer upon receiving the new address; a buffer control unit which performs one of issuing an access request to an external memory I/F or outputting the data in the data buffer to the first master, depending on the comparison result; a specific access detection unit which disables the contents of the data buffer irrespective of the comparison result.

17 Claims, 18 Drawing Sheets

MEMORY CONTROL APPARATUS

BACKGROUND OF THE INVENTION (1) Field of the Invention

The present invention relates to a memory control apparatus which allows a plurality of masters to share data on an external memory and performs data transfer between the respective masters and the external memory.

(2) Description of the Related Art

In order to efficiently read out data on an external memory, the following techniques have been conventionally used: preparing a data buffer for the unit of access of the external memory side and reading out, in advance, data corresponding to the data buffer unit from the external memory and storing the data in the buffer in the case where a unit of access of an interface which accesses the external memory is larger than a unit of access of a master in a memory control apparatus; and reading out data from the data buffer without accessing the external memory in the case where read accesses to a unit address area occur in series. Here, when a specific master reads out the data, on the external memory, which has been rewritten by another master, the data buffer needs to be disabled because the data buffer is not always consistent with the external memory.

The following technique discloses: regarding, as a specific address, one of the addresses in a data buffer (for example, a start address or an end address of each data block of, for example, 16 bytes), and when it is detected that the master has read out data on the specific address, allowing a buffer control apparatus to disable the data buffer and read out data corresponding to a unit of access from the external memory in parallel, in order to reduce the number of accesses of the master by this disabling access (refer to Patent Reference 1: Japanese Patent Application Publication No. 6-243037, page 6 and FIG. 1).

In the case where a master of the apparatus disclosed in the above-described Publication accesses, at random, a specific address which is one of the addresses in a data buffer, the data buffer is always disabled at the time when the specific address is read out. This causes a problem that a hit rate of data in the data buffer becomes low, and thus the access efficiency to the external memory deteriorates.

In addition, a conventionally-performed approach in the case where the data buffer needs to be disabled is issuing an access request, as a dummy access request, for another address area on the external memory. This causes a problem that useless access time is required for issuing the access request to the external memory.

In addition, in a comparatively simple system which does not perform any exclusive control between the masters, an identical address is repeatedly read out, repeating a hit of data in a buffer when a specific master repeatedly makes a polling access to the specific address in order to detect whether the status of a system on the external memory has been rewritten by another master. This causes a problem that the data buffer becomes inconsistent with the external memory. However, the above-described Publication does not disclose the means to solve these problems.

FURTHER INFORMATION ABOUT TECHNICAL BACKGROUND TO THIS APPLICATION

The disclosure of Japanese Patent Application No. 2005-271033 filed on Sep. 16, 2005 including specification, drawings and claims is incorporated herein by reference in its entirety.

SUMMARY OF THE INVENTION

The present invention has been conceived considering these circumstances, and aims to provide a memory control apparatus which ensures consistency with an external memory while suppressing deterioration in external memory accessing efficiency.

In order to solve the above-described problems, the memory control apparatus of the present invention performs data transfer between a master and an external memory, and includes: a master interface which receives an access request from the master and issues the access request to the external memory; and an external memory interface which receives the access request from the master interface and accesses the external memory. The master interface in the apparatus includes: a data buffer which stores data transferred from the external memory interface when the access request is issued; an address buffer which stores an address for which the access request has been issued; a first comparison unit which compares a new address for which the access request has newly been issued with the address stored in the address buffer, and outputs first comparison information indicating whether or not the new address matches the address stored in the address buffer which indicates an address range of data stored in the data buffer; a buffer control unit which issues an access request to the external memory interface, in the case where the first comparison information indicates a mismatch between the new address and the stored address, and which outputs data from the data buffer to the master without issuing an access request to the external memory interface, in the case where the first comparison information indicates a match between the new address and the stored address; and a specific access detection unit which detects the new access request made by the master to a specific address on the external memory and determines, irrespective of whether the first comparison information indicates the match or the mismatch, whether or not to issue an access request to the external memory interface so as to control the buffer control unit based on the determination.

In addition, the specific access detection unit in the memory control apparatus may include: a second comparison unit which compares the new address with the specific address on the external memory, and outputs, to the buffer control unit, second comparison information indicating whether or not the new address matches the specific address; and a buffer disabling unit which disables the content of the address buffer and controls the buffer control unit to make a dummy response to the access request, in the case where the second comparison information indicates a match between the new address and the specific address.

In addition, in the memory control apparatus, the specific address may be included in a specific area, on the external memory, where an access from the master is prohibited because the specific address is used by the external memory interface during access control.

In addition, the specific access detection unit in the memory control apparatus may further include a specific address setting register where a specific address can be arbitrarily set.

In addition, the memory control apparatus may further include a dummy access issuance unit which receives a notification indicating that shared data on the external memory has been updated, and issues, to the master interface, the access request for the specific address.

In addition, the specific access detection unit in the memory control apparatus may control the buffer control unit to forcibly issue or prohibit issuance of an access request to the external memory interface, depending on the comparison between the new address and an address in access history and irrespective of whether the first comparison information indicates the match or the mismatch.

In addition, the specific access detection unit in the memory control apparatus may include: a buffer access history storage unit which stores history information indicating whether the master accessed the external memory interface or the master accessed the data buffer; a third comparison unit which compares the new address with the address stored in the address buffer, and outputs, to the buffer update unit, the third comparison information indicating whether or not the new address completely matches the stored address; and a buffer update unit which controls the buffer control unit to forcibly issue an access request to the external memory interface, in the case where the third comparison information indicates a match between the new address and the stored address and the history information of the buffer access history storage unit indicates an access to the data buffer.

In addition, the memory control apparatus may further include a dummy access issuance unit which receives a notification indicating that shared data on the external memory has been updated, and issues, to the master interface an access request for an address stored in the address buffer.

In addition, the master in the memory control apparatus may be a Direct Memory Access (DMA) controller. The notification may indicate an activation request for activating the DMA controller, and the dummy access issuance unit may control the DMA controller to start data transfer after the access request is issued at the time of receiving the notification.

In addition, the DMA controller in the memory control apparatus may include a plurality of channels. The notification may indicate an activation request for activating one of the plurality of channels. The memory control apparatus may further include a dummy access control register where a value indicating "enable" or "disable" is set on a channel basis, and the dummy access issuance unit may prohibit issuance of the access request, in the case where the value set in the dummy access control register indicates "disable" with respect to the channel to which the activation request has been issued by the notification.

In addition, the DMA controller in the memory control apparatus may include a plurality of channels. The notification may indicate an activation request for activating one of the plurality of channels and an activation factor of the activation request. The memory control apparatus may further include a dummy access control register, which is shared among the channels, in which a value indicating "enable" or "disable" is set on an activation factor basis. The dummy access issuance unit may prohibit issuance of the access request, in the case where the value set in the dummy access control register indicates "disable" with respect to the activation factor indicated by the notification.

In addition, the specific access detection unit in the memory control apparatus may include: an access history buffer which stores access information including at least the address in the access history; a fourth comparison unit which compares new access information, which includes at least the new address for which the new access request has been issued, with the access information stored in the access history buffer, and outputs the fourth comparison information indicating whether or not an identical access has been repeated; and a buffer disabling unit which controls the buffer control unit to forcibly issue an access request to the external memory interface, in the case where the fourth comparison information indicates that the identical access has been repeated.

In addition, when the buffer disabling unit controls the buffer control unit to issue an access request to the external memory interface, the buffer disabling unit in the memory control apparatus may control the buffer control unit to issue an access request for requesting data corresponding to a request size indicated by the new access request, in the case where the fourth comparison information indicates that the access has been repeated, and the buffer disabling unit may control the buffer control unit to issue an access request for requesting data corresponding to the size of the data buffer, in the case where the fourth comparison information indicates that no identical access has been repeated.

In addition, the memory control apparatus may further include a buffer update unit which updates a content of the data buffer using data read out from the external memory interface, in the case where the fourth comparison information indicates that the identical access has been repeated.

In addition, the external memory interface in the memory control apparatus may include: a polling address setting register where an address on the external memory can be arbitrarily set; a polling access history storage unit which is set triggered by a read access made to the address which has been set in the polling address setting register and is reset triggered by a write access made to the address which has been set in the polling address setting register; and an external memory selection unit which prohibits an access to the external memory and makes a response to the master interface within a time which is short compared to a time required in the case of accessing the external memory, in the case where the polling access history storage unit has been set by the time when the master interface makes a read access request for the address set in the polling address setting register. The specific access detection unit may further include a buffer selection unit which controls the buffer control unit to output data stored in the data buffer to the master, in the case where the external memory interface makes the response within a predetermined time period.

In addition, the polling access history storage unit in the memory control apparatus may be reset triggered by a read access which the master interface makes to an address other than the polling address.

In addition, the present invention can be realized not only as a memory control apparatus like this, but also as a memory control method having steps of the processes to be executed by the unique units provided with the memory control apparatus. In addition, the present invention can be realized as an integrated circuit apparatus for memory control.

With the memory control apparatus according to the present invention, a specific address is defined on the external memory. This eliminates unnecessary disabling of a data buffer in the case where a master randomly accesses the data in the data buffer. This prevents any deterioration in a hit rate of data in the data buffer and thus it becomes possible to access the external memory efficiently.

In addition, in the case where an access request for the specific address is issued, the data buffer is disabled, but the external memory is not accessed. Therefore, as in the case where a polling access is made to the data, on the external memory, which is to be rewritten by another master, no useless access is outputted to the external memory at the time of performing necessary disabling. This makes it possible to guarantee consistency between the data buffer and the external memory without increasing an access load to the external memory.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings.

DESCRIPTION OF THE PREFERRED EMBODIMENT(S)

Embodiments of the present invention will be described with reference to the drawings.

First Embodiment

Figure 1:
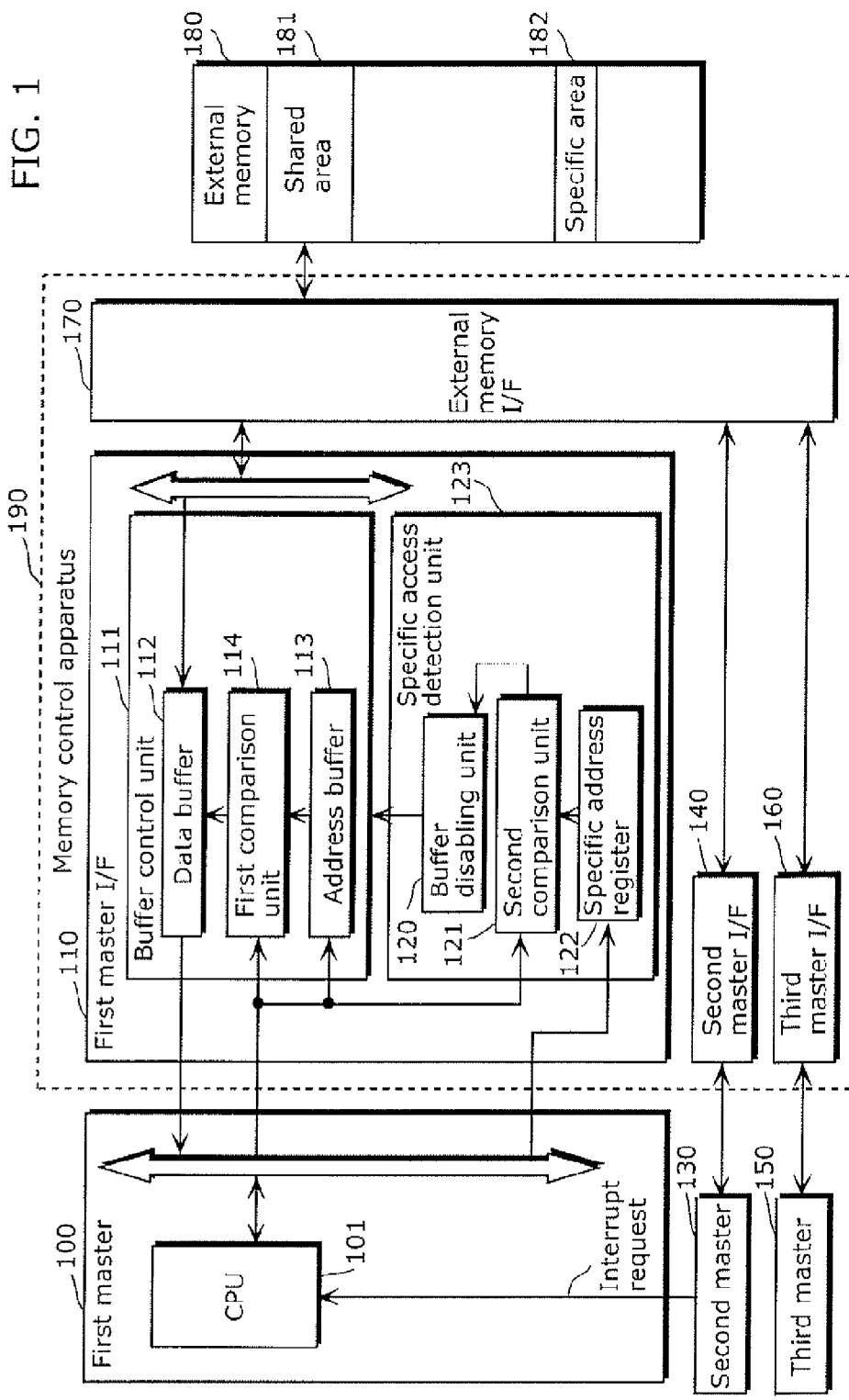
FIG. 1 is a block diagram showing an example of a functional configuration of a memory control apparatus in a first embodiment.

FIG. 1 is a block diagram showing an example of a functional configuration of a memory control apparatus 190 in a first embodiment. FIG. 1 shows a first master 100, a second master 130, a third master 150 and an external memory 180, in addition to the memory control unit 190.

The first master 100, the second master 130 and the third master 150 respectively access data on the external memory 180 through the memory control apparatus 190.

The memory control apparatus 190 is an apparatus which processes access requests from the respective masters to the data in a shared area 181 of the external memory 180 shared among the respective masters. The memory control apparatus 190 is configured with a first master interface (I/F) 110, a second master I/F 140, a third master I/F and an external memory I/F 170 which are set in association with the first master 100, the second master 130 and the third master 150.

The external memory 180 is connected to the external memory I/F 170, and includes a shared area 181 and a specific area 182.

The shared area 181 is a part of the area on the external memory 1801 and stores the data shared among the respective masters. More specifically, the shared area 181 is used for data exchange, for example, from the second master 130 to the first master 100.

The specific area 182 exists on the external memory 180. For example, it is used by the external memory I/F at the time of access control such as rethink, and thus it is indicated by a specific address where any access from each master is prohibited.

The first master 100 is connected to the first master I/F 110, and includes a CPU 101.

On rewriting data on the shared area 181, the second master 130 outputs an interrupt request signal to the first master 100. When this signal is inputted, the CPU 101 in the first master 100 starts reading out the rewritten data on the shared area 181 by issuing a read access request to the first master I/F 110.

The first master I/F 110 is intended for receiving an access request from the first master 100 and issuing an access request to the external memory I/F 170. The first master I/F 110 includes a buffer control unit 111 and a specific access detection unit 123.

The buffer control unit 111 includes a data buffer 112, an address buffer 113 and a first comparison unit 114. The specific access detection unit 123 includes a buffer disabling unit 120, a second comparison unit 121 and a specific address register 122.

The data buffer 112 stores a copy of at least a part of the data on the external memory 180.

The address buffer 113 stores addresses of the data stored in the data buffer 112.

The first comparison unit 114 by compares the address for which an access request is issued by the first master 100 with the address stored in the address buffer 113 and outputs first comparison information indicating whether or not the address for which an access request is issued by the first master 100 matches an address within an address range of data stored in the data buffer 112.

In the case where no disabling control signal is outputted from the buffer disabling unit 120 and the first comparison information of the first comparison unit 114 indicates that the address does not match the stored data, the buffer control unit 111 issues an access request to the external memory I/F 170. In the case where the first comparison information indicates that the address matches the stored data, the buffer control unit 111 outputs the data stored in the data buffer 112 to the first master 100.

An address of the specific area 182 in the external memory 180 is set by the CPU 101 in the specific address 122.

The second comparison unit 121 compares the address for which an access request is issued by the first master 100 with the address stored in the specific address register 122, and outputs second comparison information indicating whether or not the addresses match each other to the buffer disabling unit 120.

The buffer disabling unit 120 obtains the second comparison information form the second comparison unit 121, and outputs a disabling control signal to the buffer control unit 111, in the case where the obtained second comparison information indicates that the addresses match each other.

When this disabling control signal is inputted, the buffer control unit 111 disables the data buffer 112, and immediately makes an access response to the first master 100. This allows an access request to be issued to the external memory I/F 170 irrespective of the first comparison information of the first comparison unit 114 at the time when a next access request is issued by the first master 100.

More specifically, the data buffer 112 may be disabled by causing the first comparison unit 114 to update, for example, the address buffer 113 using an invalid address so that the first comparison information indicating that the address does not match is to be outputted irrespective of the original comparison result. In addition, the data buffer 112 may be disabled by preparing a register, which is not shown, indicating whether or not the data buffer is disabled and updating the contents of the data buffer.

The second master 130 is connected to the second master I/F 140.

The second master I/F 140 receives an access request from the second master 130, and issues an access request to the external memory I/F 170.

The third master 150 is connected to the third master I/F 160.

The third master I/F 160 receives an access request from the third master 150, and issues an access request to the external memory I/F 170.

The second master I/F 140 and the third master I/F 160 each has the same configuration as the first master I/F 110, and thus they are not described.

The external memory I/F 170 receives access requests respectively from the first master I/F 110, the second master I/F 140 and the third master I/F 160, and accesses the external memory 180.

(Description of First Operation)

Next, an operation example of the first embodiment will be described.

Figure 2:
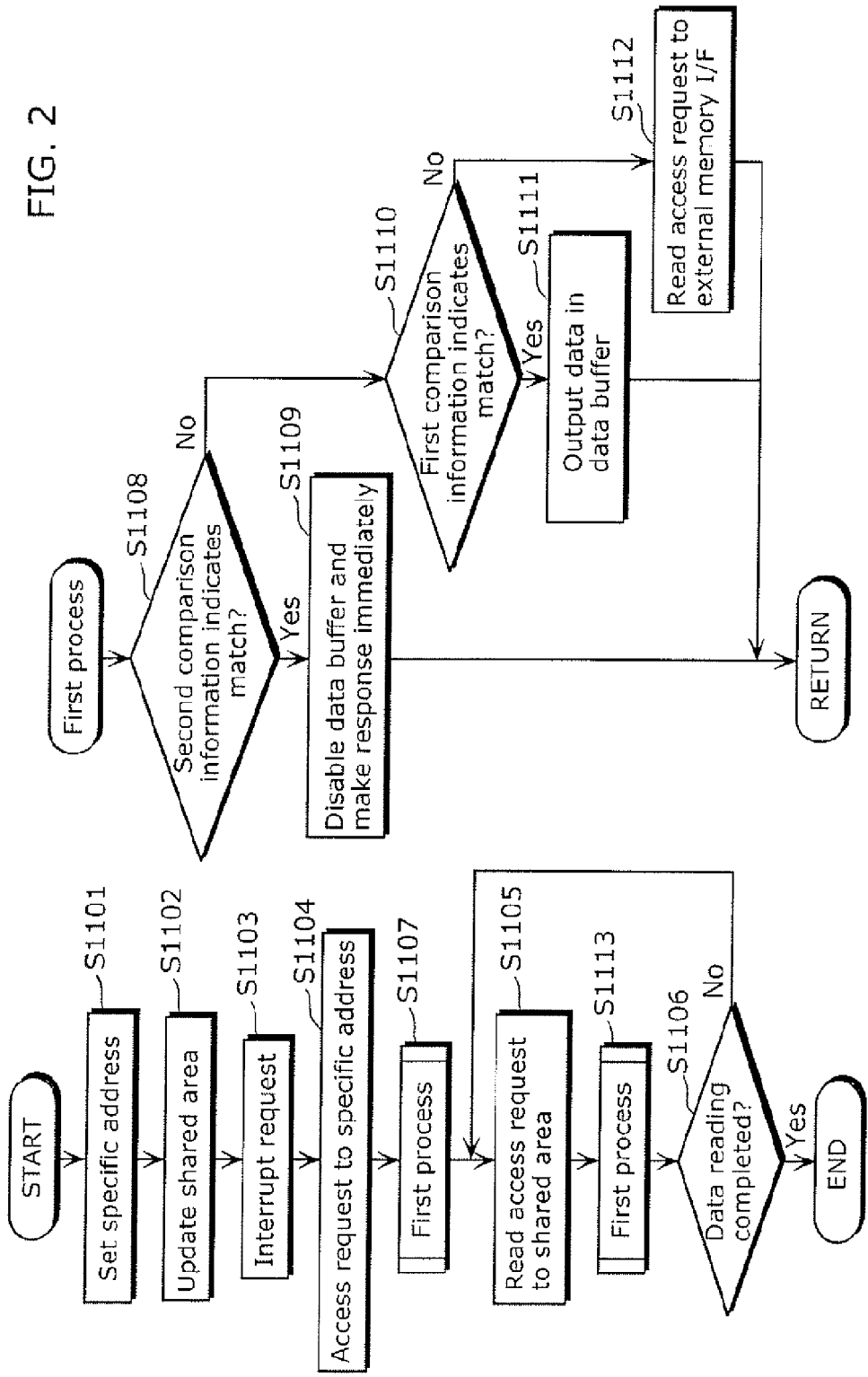
FIG. 2 is a flow chart indicating an operation example of the memory control apparatus in the first embodiment.

FIG. 2 is a flow chart indicating an operation example of the memory control apparatus 190 in the first embodiment.

The first master 100 sets an address value indicating a specific area 182 on the external memory 180 to the specific address register 122 (Step 1101).

The second master 130 writes the data to be passed to the first master 100 into the shared area 181 on the external memory 180 (Step 1102), and then issues an interrupt request to the first master 100 in order to notify that the data to be passed is prepared (Step 1103).

On receiving an interrupt request from the second master 130, the first master 100 issues a write access request for the specific area 182 on the external memory 180 where any access is prohibited under normal operation (Step 1104). In order to process this write access request, the first process which is a subroutine is called (Step 1107). The first process will be described later on.

The first master 100 issues a read access request in order to read out the data which has been written, by the second master 130, in the shared area 181 on the external memory 180 (Step 1105). The first process is called in order to process this read access request (Step 1113).

The first master 100 issues a read access request returning to Step 110S until reading-out of the data written in the shared area 181 is completed (No in Step 1106), and finishes the operation when the reading-out is completed (Yes in Step 1106).

Next, the first process is described. This process is a subroutine process to be executed by the first master I/F 110.

In the case where the second comparison information from the second comparison unit 121 indicates that the addresses match each other (Yes in Step 1108), by outputting a disabling control signal to the buffer control unit 111, the buffer disabling unit 120 controls the buffer control unit 111 to disable the data buffer 112 and to immediately make an access response to the first mater 100 (Step 1109). It should be noted here that this access response is made within a time which is sufficiently short compared to the time from when an access request is issued to the external memory I/F 170 to when the access response is made.

In the case where the second comparison information indicates that the addresses do not match each other, no disabling control signal is outputted (No in Step 1108). In the case where the first comparison information from the first comparison unit 114 indicates that the address matches the stored address (Yes in Step 1110), the buffer control unit 111 outputs the data stored in the data buffer 112 to the first master 100 (Step 1111). In the case where the first comparison information indicates that the address matches the stored address (No in Step 1110), the buffer control 111 issues an access request to the external memory I/F 170 (Step 1112).

Note that the data buffer 112 may be disabled under the initial state. If doing so, both the first comparison information and the second comparison information indicate that the address does not match the stored address, in the first process which is called firstly (No in Step 1108 and Step 1110), and an access request to the external memory I/F 170 is always issued in Step 1112.

With the configuration described above, it becomes possible to set a specific address for disabling a data buffer onto an external memory outside the data buffer. Therefore, in the case where a master randomly accesses the data inside the data buffer, no unnecessary disabling of the data buffer is performed. This makes it possible to prevent any deterioration in a hit rate of data in the data buffer, and to efficiently access the external memory.

In addition, similar to the case where a specific master makes a polling access to the data, on the external memory, which is rewritten by another master, no access to the external memory is made even in the case where an access for data disabling is performed as necessary. Therefore, such unnecessary access is eliminated.

In this way, an access to an external memory is always made immediately after data buffer disabling without increasing an access load to the external memory due to such disabling. Therefore, it becomes possible to surely obtain consistency between the data buffer and the external memory.

In the first embodiment, such configuration has been described that uses one of the addresses in a specific area on an external memory as a specific address for data buffer disabling.

However, the configuration of the first embodiment has a problem of incapable of setting a specific address in the case where the specific area that the external memory I/F uses at the time of access control is unknown or unprepared. A configuration desired in order to solve the problem like this is such configuration that realizes data buffer disabling without using any specific area on the external memory.

Such configuration will be described below in a second embodiment.

Second Embodiment

Figure 3:
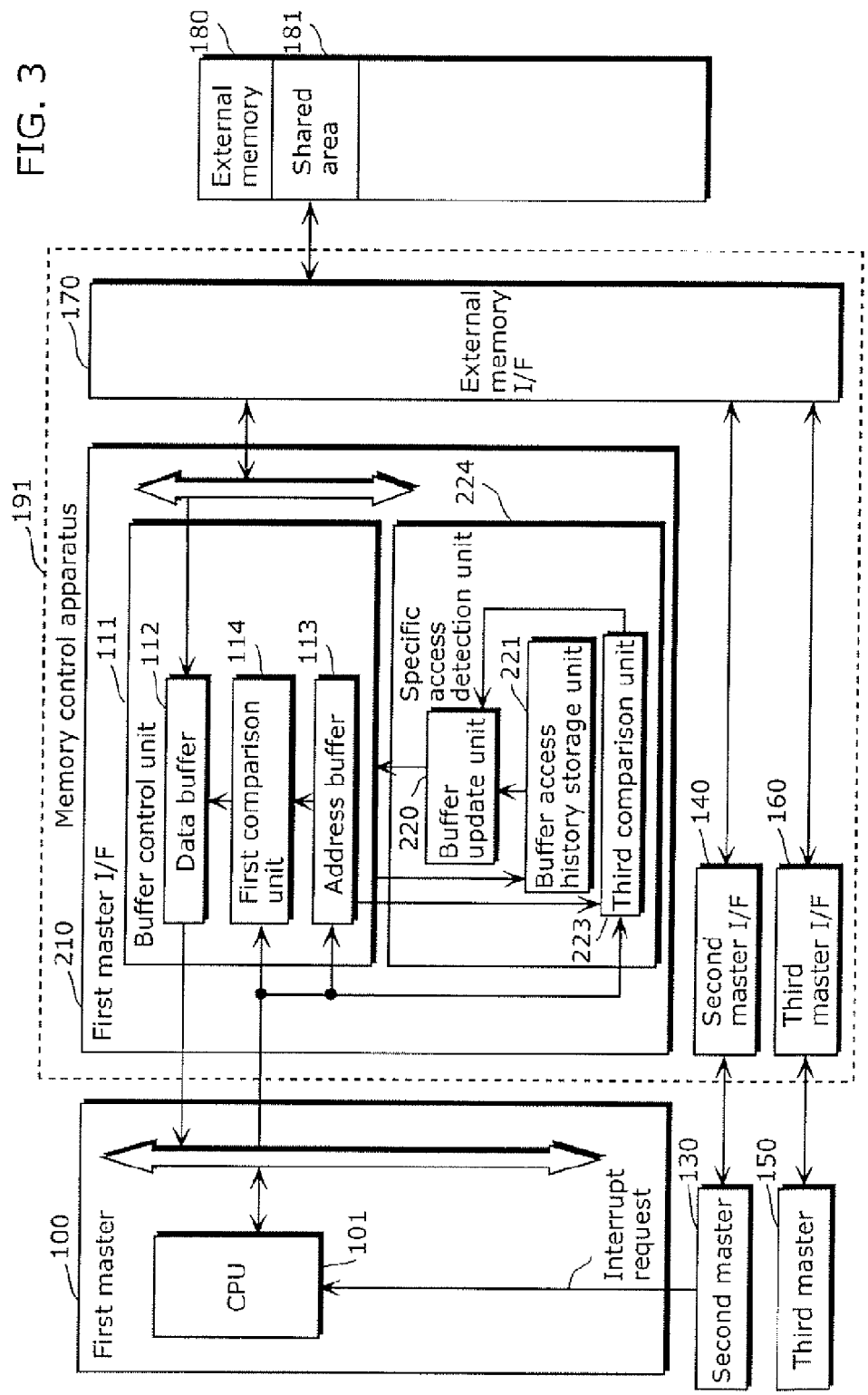
FIG. 3 is a block diagram showing an example of a functional configuration of a memory control apparatus in a second embodiment.

FIG. 3 is a block diagram showing an example of a functional configuration of a memory control apparatus 191 in the second embodiment. FIG. 3 shows a first master 100, a second master 130, a third master 150 and an external memory 180 in addition to the memory control apparatus 191.

The memory control apparatus 191 is configured by replacing the specific access detection unit 123 in the first master I/F 110 of the memory control apparatus 190 (refer to FIG. 1) which has been described in the first embodiment by the specific access detection unit 224. In FIG. 3, the same functional blocks as those in the memory control apparatus 190 are provided with the same reference numerals, and they are not described again.

The specific access detection unit 224 is intended for controlling the buffer control unit 11 to forcibly access the external memory 180 every other time, in the case where a series of access requests are made for the same address. The specific access detection unit 224 includes a buffer update unit 220, a buffer access history storage unit 221 and a third comparison unit 223.

When an access request from the first master 100 is made, the buffer access history storage unit 221 stores history information indicating whether the access made in response to the access request is an access to the external memory I/F 170 or whether the access made in response to the access request is an access to the data buffer 112.

More specifically, this history information indicates whether the access request to the external memory I/F 170 is made or whether the data is outputted from the data buffer 112 to the first master 100, depending on the access request from the first master 100.

The third comparison unit 223 compares the address for which an access request is made from the first master 100 with the address stored in the address buffer 113, and outputs a third comparison information indicating whether or not these addresses match each other to the buffer update unit 220.

The buffer update unit 220 obtains the third comparison information from the third comparison unit 223, and obtains history information from the buffer access history storage unit 221. Subsequently, in the case where the third comparison information indicates that the address matches the stored address and the history information indicates an access to the data buffer, the buffer update unit 220 outputs an update control signal to the buffer control unit 111. When this update control signal is given to the buffer control unit 111, it issues an access request to the external memory I/F 170 irrespective of the first comparison information of the first comparison unit 114.

(Description of Second Operation)

Next, an operation example of the second embodiment will be described.

Figure 4:
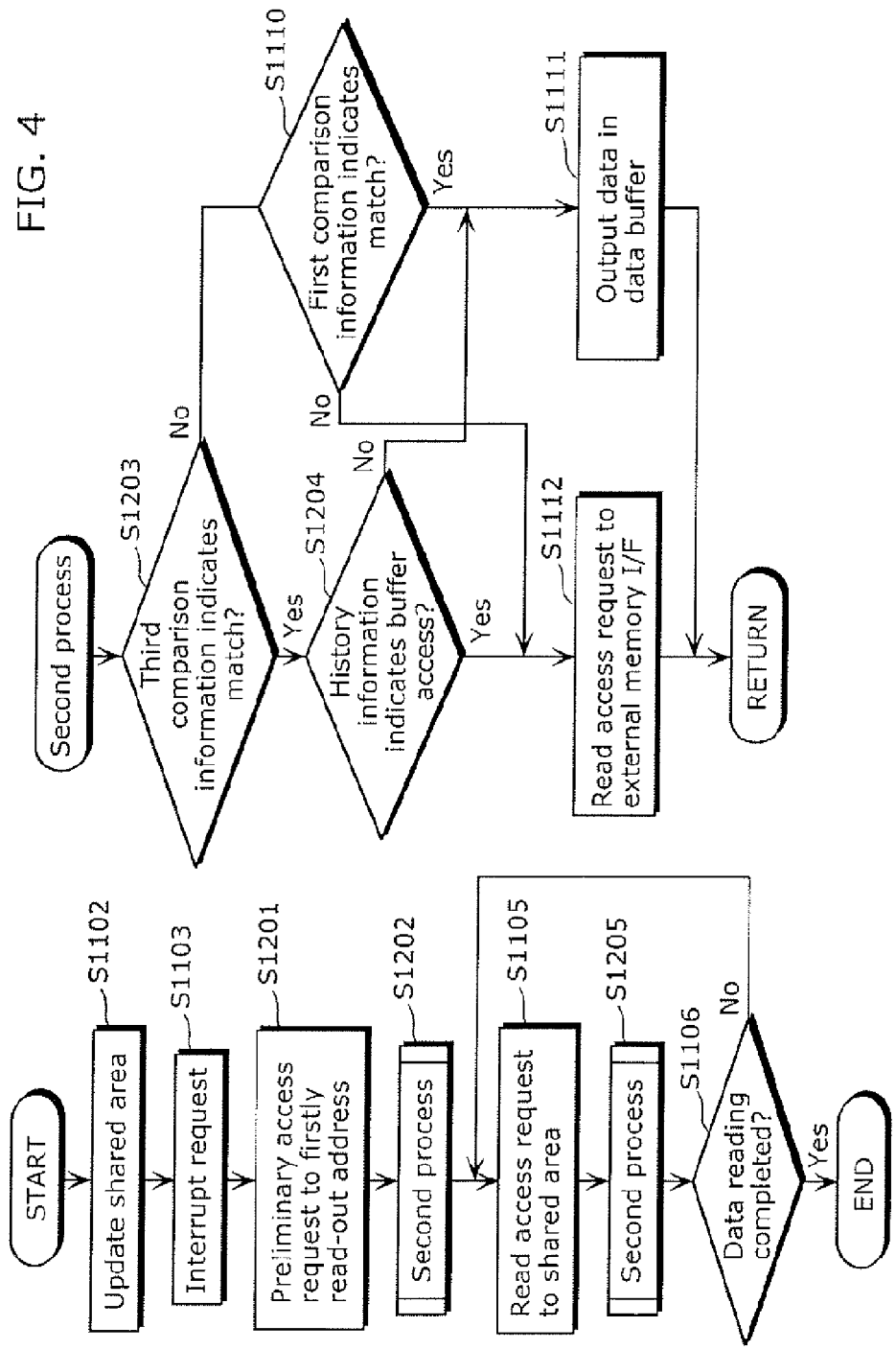
FIG. 4 is a flow chart indicating an operation example of the memory control apparatus in the second embodiment.

FIG. 4 is a flow chart indicating an operation example of the memory control apparatus 191 in the second embodiment.

The same steps as those of the operation example of the memory control apparatus 190 described in the description of the first operation are provided with the same reference numerals, and they are not described again.

Upon receiving an interrupt request from the second master 130, the first master 100 preliminary issues a read access request for the address where data is to be read out from a shared area for the first time (Step 1201). In order to process this read access, a second process which is a subroutine is called (Step 1202). The second process will be described later on.

Subsequently, the first master 100 issues a read access request in order to read out data, written by the second master 130, in a shared area 181 on the external memory 180. In order to process this read access request, the second process is called (Step 1205).

In the second process, in the case where third comparison information from a third comparison unit 223 indicates that the address matches the stored address (Yes in Step 1203) and the history information of a buffer access history storage unit 221 indicates an access to the data buffer 112 (Yes in Step 1204), the buffer update unit 220 outputs a first update control signal to the buffer control unit 111 so as to control the buffer control unit 111 to issue an access request to the external memory I/F 170 (Step 1112). In addition, in the case where history information of the buffer access history storage unit 221 indicates an access to an external memory 180 (No in Step 1204), the buffer update unit 220 outputs a second update control signal to the buffer control 111 so as to control the buffer control unit 111 to output data of the data buffer 112 to the first master 100 (Step 1111).

On the other hand, in the case where the third comparison information from the third comparison unit 223 indicates that the address does not match the stored address, the first and second update control signals are not outputted (No in Step 1203). In the case where first comparison information from a first comparison unit 114 indicates that the address matches the stored address (Yes in Step 1110), the buffer control unit 111 outputs data stored in the data buffer 112 to the first master 100 (Step 1111). In the other case where the first comparison information indicates that the address does not match the stored address (No in Step 1110), the buffer control unit 111 issues an access request to the external memory I/F 170 (Step 1112).

Here, from the preliminary read access in Step 1201 to the first data reading-out in Step 1105, consistency between the respective data buffers and the external memory is guaranteed without increasing an access load to the external memory. This is described below in detail.

In Step 1201, a preliminary read access request has been issued for the data to be read out from the shared area for the first time. Therefore, the third comparison information always indicates that the address matches the stored address which is called from the first data reading-out in Step 1105 in Step 1203.

In Step 1204, the history information of the buffer access history storage unit 221 is referred to. The history information at this time indicates whether the data buffer 112 has been accessed or whether the external memory 180 has been accessed, in response to the earlier-mentioned preliminary read access request.

In the case where an access to the data buffer 112 is indicated, a read access request to the external memory I/F is issued in Step 1112, and the latest data is obtained. Thus, the consistency between the data buffer 112 and the external memory 180 is guaranteed.

In the other case where an access to the external memory 180 is indicated, the data of the data buffer is outputted in Step 1111. Since the data contents is the latest contents which has just been obtained from the external memory in response to the preliminary access request which was issued immediately before, the consistency between the data buffer 112 and the external memory 180 is also guaranteed.

Subsequently, both the cases only require one-time access to the external memory.

With the above-mentioned configuration, using an access start address for a dummy access provides an advantage of being able to disable a data buffer without increasing useless access time to the external memory, even in the case where a specific area as described in the first embodiment cannot be prepared on the external memory 180.

The second embodiment has described a configuration enabling to obtain the latest data from the external memory without increasing useless accesses to the external memory due to a series of read accesses to the same address.

However, in the first and second embodiments, a data buffer is disabled and the latest data is obtained from the external memory. Therefore, there is a need to execute a program with an intention to issue a preliminary write access request for a specific address or a preliminary read access request for an access start address. In other words, there is a problem that software care becomes necessary. A configuration desired in order to solve the problem is such configuration that allows disabling of a data buffer without software care.

Such configuration will be described below in a third embodiment and in a fourth embodiment.

Third Embodiment

Figure 5:
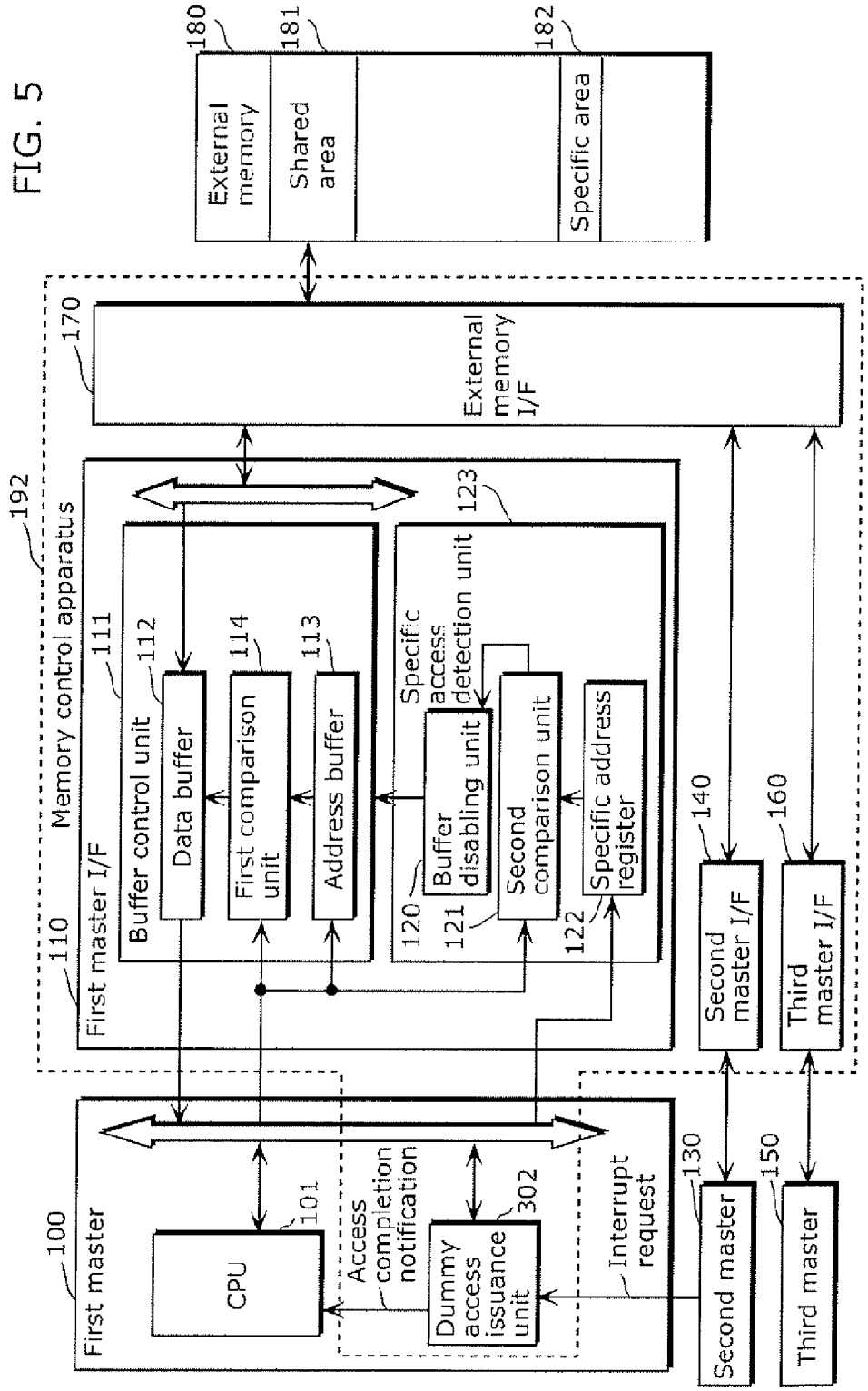
FIG. 5 is a block diagram showing an example of a functional configuration of a memory control apparatus in a third embodiment.

FIG. 5 is a block diagram showing an example of a functional configuration of a memory control apparatus 192 in the third embodiment. FIG. 5 shows a first master 100, a second master 130, a third master 150 and an external memory 180 in addition to the memory control apparatus 192.

The memory control apparatus 192 is configured by adding a dummy access issuance unit 302 to the memory control apparatus 190 (refer to FIG. 1) described in the first embodiment. The same functional blocks in FIG. 5 as those of the memory control apparatus 190 are provided with the same reference numerals and they are not described again.

The dummy access issuance unit 302 is intended for receiving, from the second master 130, an interrupt request which is notification indicating that the data of the shared area 181 on the external memory 180 has been updated and issuing, to the first master I/F 110, an access request for the earlier-mentioned specific address.

When the dummy access issuance unit 302 receives, from the first master I/F 110, a response to the access request, it issues an access completion notification to a CPU 101.

Here, it may be assumed that the interrupt request and the access completion notification are signals having the same specifications. Additionally, it may be considered that the dummy access issuance unit 302 relays the interrupt request, which has been supplied from the second master 130 to the CPU 101 in the first embodiment.

(Description of Third Operation)

Next, an operation example of the third embodiment will be described.

Figure 6:
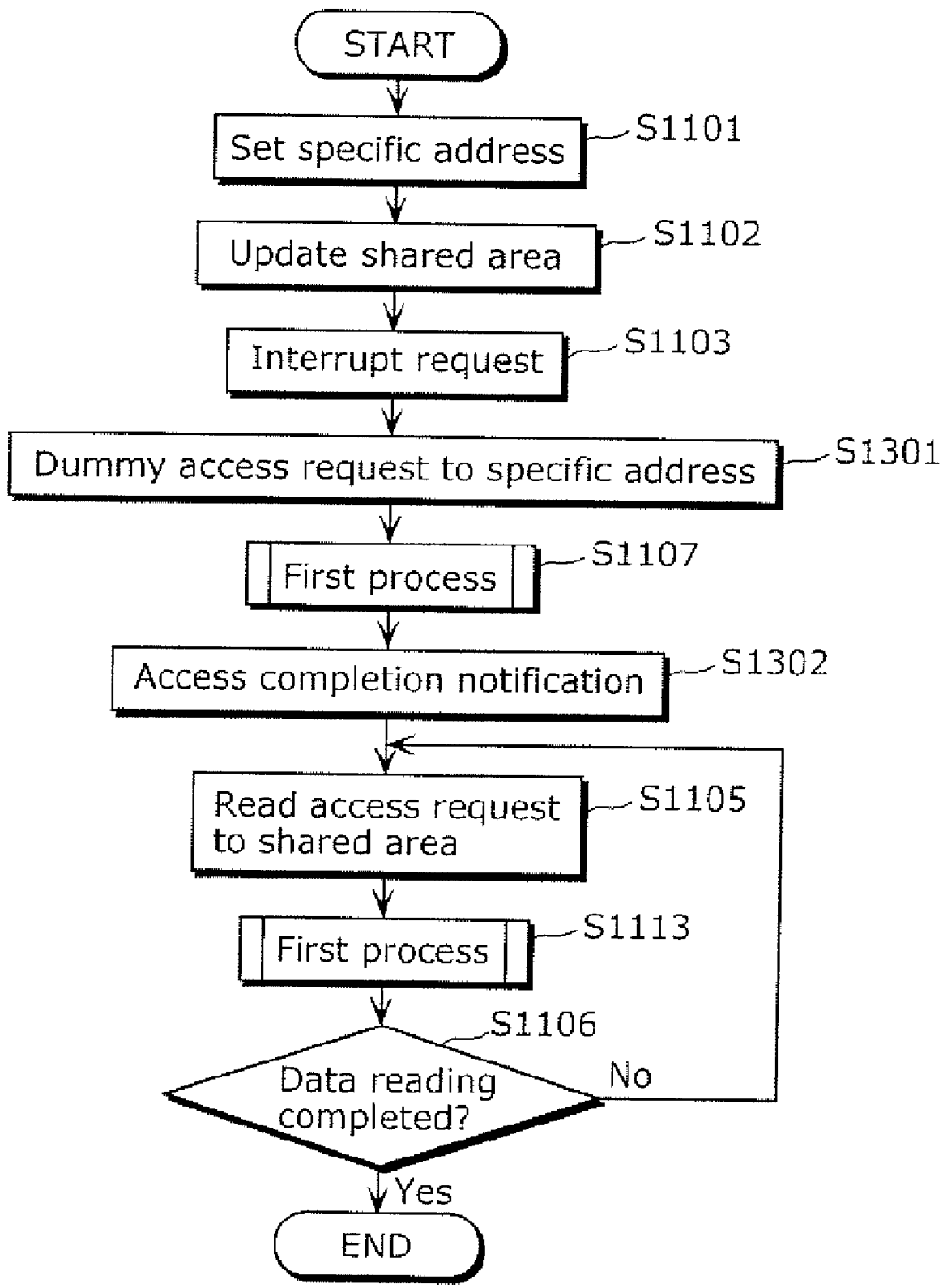
FIG. 6 is a flow chart indicating an operation example of the memory control apparatus in the third embodiment.

FIG. 6 is a flow chart indicating an operation example of the memory control apparatus 192 in the third embodiment.

The same functional steps as those of the operation example (refer to FIG. 2) of the memory control apparatus 190 described in the description of the first operation are provided with the same reference numerals, and they are not described again.

Upon receiving an interrupt request, the dummy access issuance unit 302 issues an access request for a specific address (hereafter described also as dummy access request) to the first master I/F 110 (Step 1301).

Subsequently, upon receiving the access response from the first master I/F 110, the dummy access issuance unit 302 issues an access completion notification to a CPU 101 (Step 1302).

With the above-mentioned configuration, an access for data buffer disabling is issued by the dummy access issuance unit 302 to the first master I/F 110. This eliminates software care with an intention to issue a dummy access request, and furthermore, provides an advantage of still guaranteeing the consistency between the data buffer and the external memory.

Fourth Embodiment

Next, the configuration of the fourth embodiment will be described.

Figure 7:
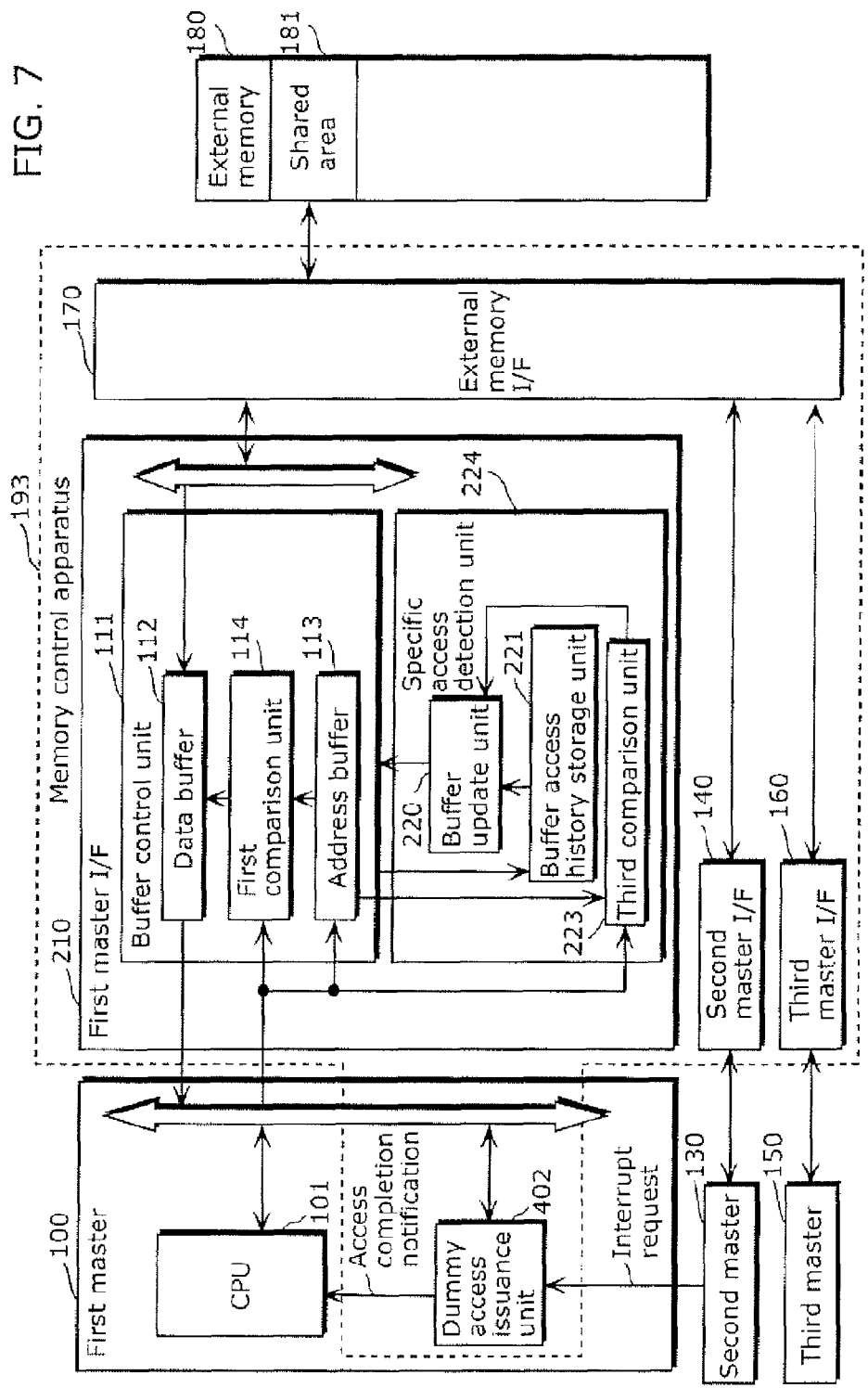
FIG. 7 is a block diagram showing an example of a functional configuration of a memory control apparatus in a fourth embodiment.

FIG. 7 is a block diagram showing an example of a functional configuration of a memory control apparatus 193 in the fourth embodiment. FIG. 7 shows a first master 100, a second master 130, a third master 150 and an external memory 180 in addition to the memory control apparatus 193.

The memory control apparatus 193 is configured by adding a dummy access issuance unit 402 to the memory control apparatus 191 (refer to FIG. 3) described in the second embodiment. The same functional blocks in FIG. 7 as those in the memory control apparatus 191 are provided with the same reference numerals, and they are not described again.

The dummy access issuance unit 402 is intended for receiving, from the second master 130, an interrupt request which is notification indicating that the data of the shared area 181 on the external memory 180 has been updated and issuing, to the first master I/F 210, an access request for the earlier-mentioned specific address.

When the dummy access issuance unit 402 receives, from the first master I/F 110, a response to the access request, it issues an access completion notification to a CPU 101.

Here, it may be assumed that the interrupt request and the access completion notification are signals having the same specifications. Additionally, it may be considered that the dummy access issuance unit 402 relays the interrupt request which has been supplied from the second master 130 to the CPU 101 in the second embodiment.

(Description of Fourth Operation)

Next, an operation example of the fourth embodiment will be described.

Figure 8:
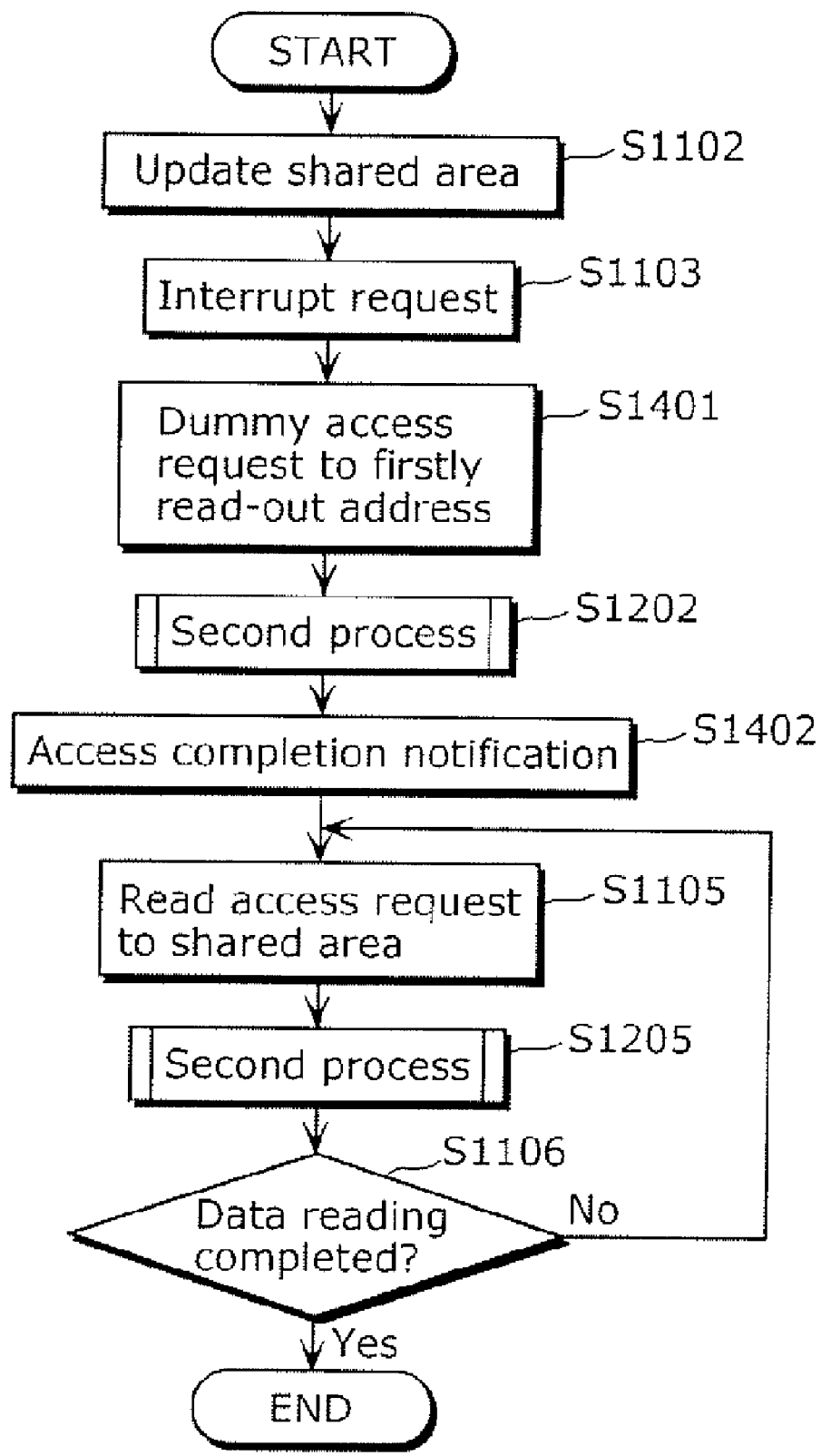
FIG. 8 is a flow chart indicating an operation example of the memory control apparatus in the fourth embodiment.

FIG. 8 is a flow chart indicating an operation example of the memory control apparatus 193 in the fourth embodiment.

The same functional steps as those of the operation example (refer to FIG. 4) of the memory control apparatus 191 described in the description of the second operation are provided with the same reference numerals, and they are not described again.

Upon receiving an interrupt request, a dummy access issuance unit 402 issues, to a first master I/F 210, a dummy access request for the address of the data to be read out from a shared area for the first time (Step 1401).

Subsequently, the dummy access issuance unit 402 receives the access response from the first master I/F 210 and issues an access completion notification to a CPU 101 (Step 1402).

With the above-described configuration, an access for data buffer disabling is issued by the dummy access issuance unit 402 to the first master I/F 210. This eliminates software care with an intention to issue a dummy access request, and furthermore, provides an advantage of still guaranteeing the consistency between the data buffer and the external memory.

In the respective third and fourth embodiments, the dummy access issuance units 302 and 402 have issued a dummy access request in place of the CPU 101 of the first master 100. However, it should be noted that a dummy access issuance unit may be applied to a master including a DMAC (DMA controller). In this case, the earlier-mentioned interrupt request denotes an activation request of the DMAC. In general, the DMAC does not have the function of executing a program for issuing a dummy access. Therefore, it is of significance that the dummy access issuance unit issues a dummy access request in place of the DMAC.

The respective third and forth embodiments have described the configurations where the dummy access issuance units 302 and 402 issue a dummy access request in place of the CPU 101 of the first master 100, eliminating software care and furthermore guaranteeing the consistency between the data buffer and the external memory. These embodiments have also described that such configurations are especially suitable for a master having a DMAC.

However, in general, a DMAC has multiple channels some of which may cause a problem that first data is read and deleted when a dummy access request is issued in response to an activation request. Such channel includes a channel which transfers data from, for example, an external input/output device. Therefore, a desired configuration is such configuration that allows prohibiting issuance of a dummy access request on a channel basis or on an activation factor basis.

Such configurations will be described below in a fifth embodiment and a six embodiment.

Fifth Embodiment

Figure 9:
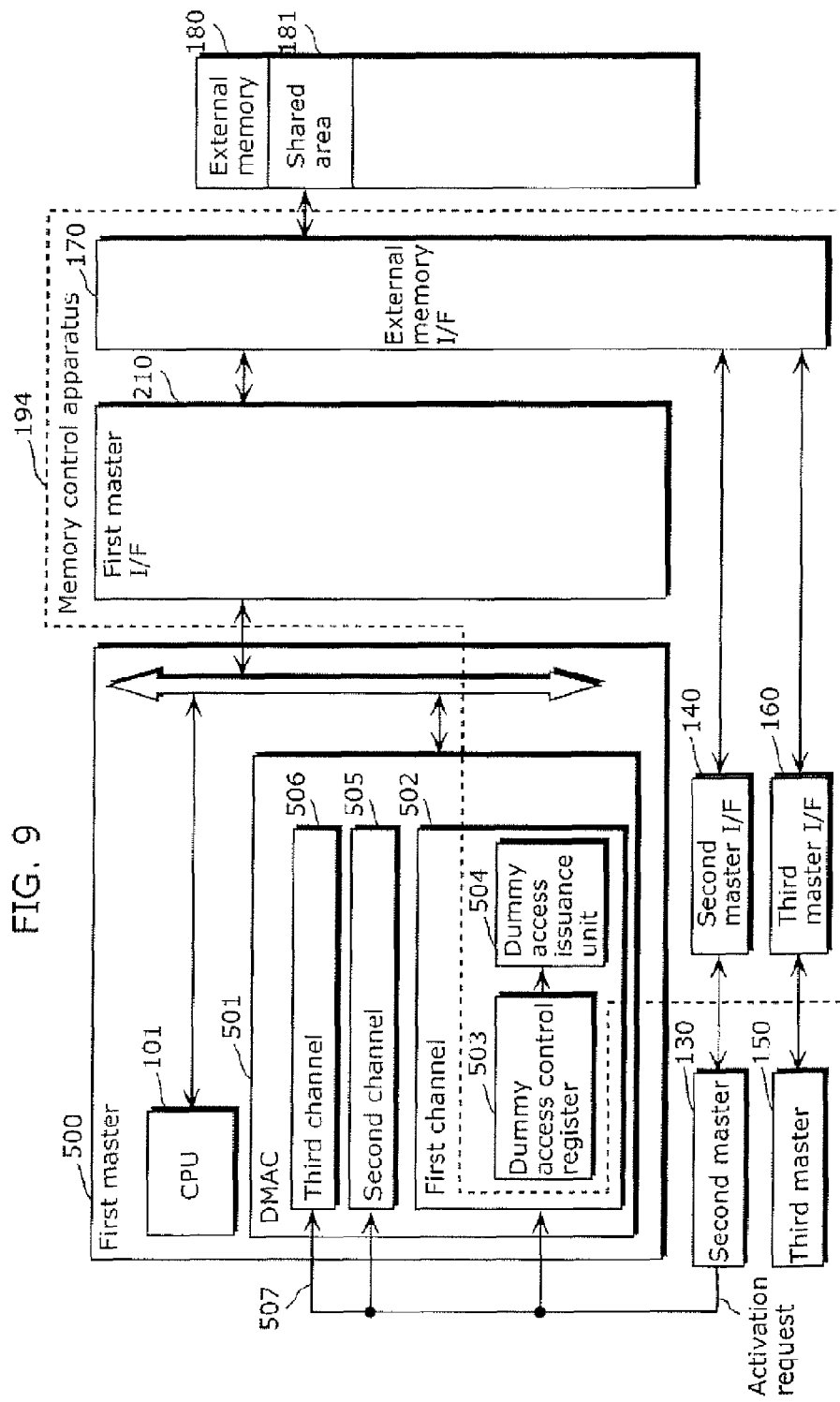
FIG. 9 is a block diagram showing an example of a functional configuration of a memory control apparatus in a fifth embodiment.

FIG. 9 is a block diagram showing an example of a functional configuration of a memory control apparatus 194 in the fifth embodiment. FIG. 9 shows a first master 500, a second master 130, a third master 150 and an external memory 180 in addition to the memory control apparatus 194.

The memory control apparatus 194 includes a dummy access issuance unit 504 and a dummy access control register 503 which are unique to the channels of the DMAC instead of the dummy access issuance unit 402 of the memory control apparatus 193 (refer to FIG. 7) described in the fourth embodiment. The same functional blocks in FIG. 9 as those of the memory control apparatus 193 are provided with the same reference numerals, and they are not described again. Additionally, detailed description of the first master I/F 210 is omitted.

The first master 500 is configured with a CPU 101 and a DMAC 501. The DMAC 501 is a three-channel DMA controller, and configured with a first channel 502, a second channel 505 and a third channel 506. The dummy access issuance unit 504 and the dummy access control register 503 shown in the first channel 502 are parts of the memory control apparatus 194.

Upon receiving an activation request from the second master 130, the first channel 502 starts transferring data according no to the contents which has been previously set in, for example, a component register (not shown in a figure).

The dummy access control register 503 stores a setting value indicating whether or not a dummy access is issued ("enable" or "disable") at the time when the first channel 502 received an activation request, and the set value is outputted to the dummy access issuance unit 504.

A second channel 505 and a third channel 506 are also provided with the same dummy access control register (not shown in a figure).

When the activation request is received, the dummy access issuance unit 504 issues a dummy access request equivalent to the dummy access request issued by the earlier-mentioned dummy access issuance unit 402 in the case where the dummy access control register is set to a value indicating "enable", or prohibits issuance of the dummy access request in the case where the dummy access control register is set to a value indicating "disable".

Each of the second channel 505 and the third channel 506 is also provided with the same dummy access issuance unit (not shown in a figure).

The second channel 505 and the third channel 506 each is configured similarly to the first channel 502. Upon receiving an activation request, the channel which has received the activation request issues a dummy access request in accordance with the value set in the corresponding dummy access control register, and starts transferring the data which has been predetermined.

(Description of Fifth Operation)

Next, an operation example of the fifth embodiment will be described.

Figure 10:
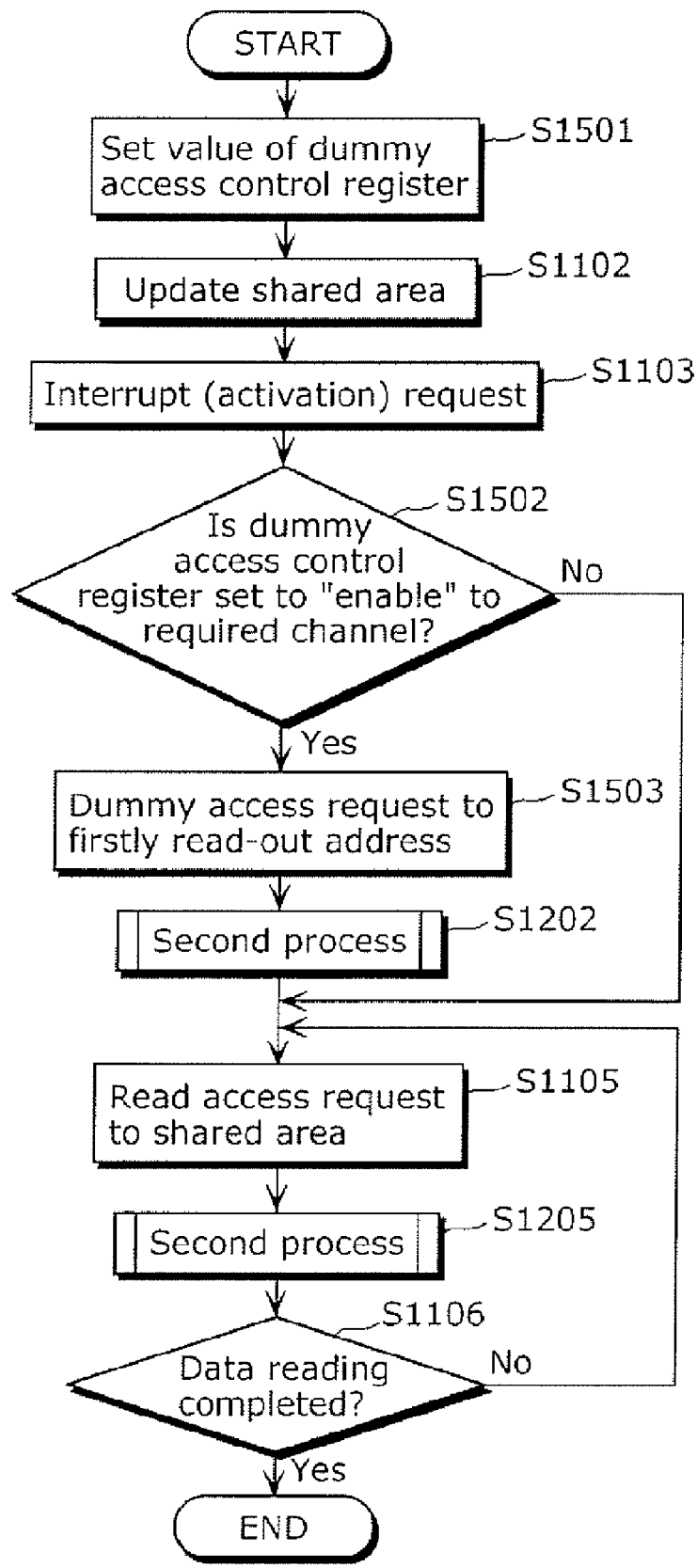
FIG. 10 is a flow chart indicating an operation example of the memory control apparatus in the fifth embodiment.

FIG. 10 is a flow chart indicating an operation example of the memory control apparatus 194 in the fifth embodiment.

The same steps as those of the operation example (refer to FIG. 8) of the memory control apparatus 193 described in the description of the fourth operation are provided with the same reference numerals, and they are not described again. Here, a description is provided assuming that the dummy access issuance unit 504 issues the same dummy access request as the dummy access request issued by the dummy access issuance unit 402.

The CPU 101 sets values of the dummy access control register 503 as to whether or not it issues a dummy access request on a channel basis (Step 1501).

After the update of the shared area 181 on the external memory 180, the dummy access issuance unit 504 of the first channel 502 receives an interrupt request, which is an activation request to the first channel 502, from the second master 130. The dummy access issuance unit 504 of the first channel 502 to which the activation request has been made refers to the contents of the dummy access control register 503. In the case where the dummy access control register 503 is set to a value indicating "enable" (Yes in Step 1502), the dummy access issuance unit 504 issues, to the first mater I/F 210, a dummy access request for the address of the data to be read out from the shared area 181 for the first time. In the other case where the dummy access control register 503 is set to a value indicating "disable" (No in Step 1502), it prohibits issuance of the dummy access request.

Subsequently, the first channel 502 of the DMAC 501 accesses the data in the shared area 181 (Step 1105 to Step 1106).

With the above-described configuration, it becomes possible to control issuance of a dummy access at the time when the DMAC is activated on a channel basis. This provides an advantage of being able to prohibit issuance of a dummy access at the time when the DMAC is activated in the case where a dummy access is unnecessary for or hazardous to the channel.

Sixth Embodiment

Next, the configuration of the sixth embodiment will be described.

Figure 11:
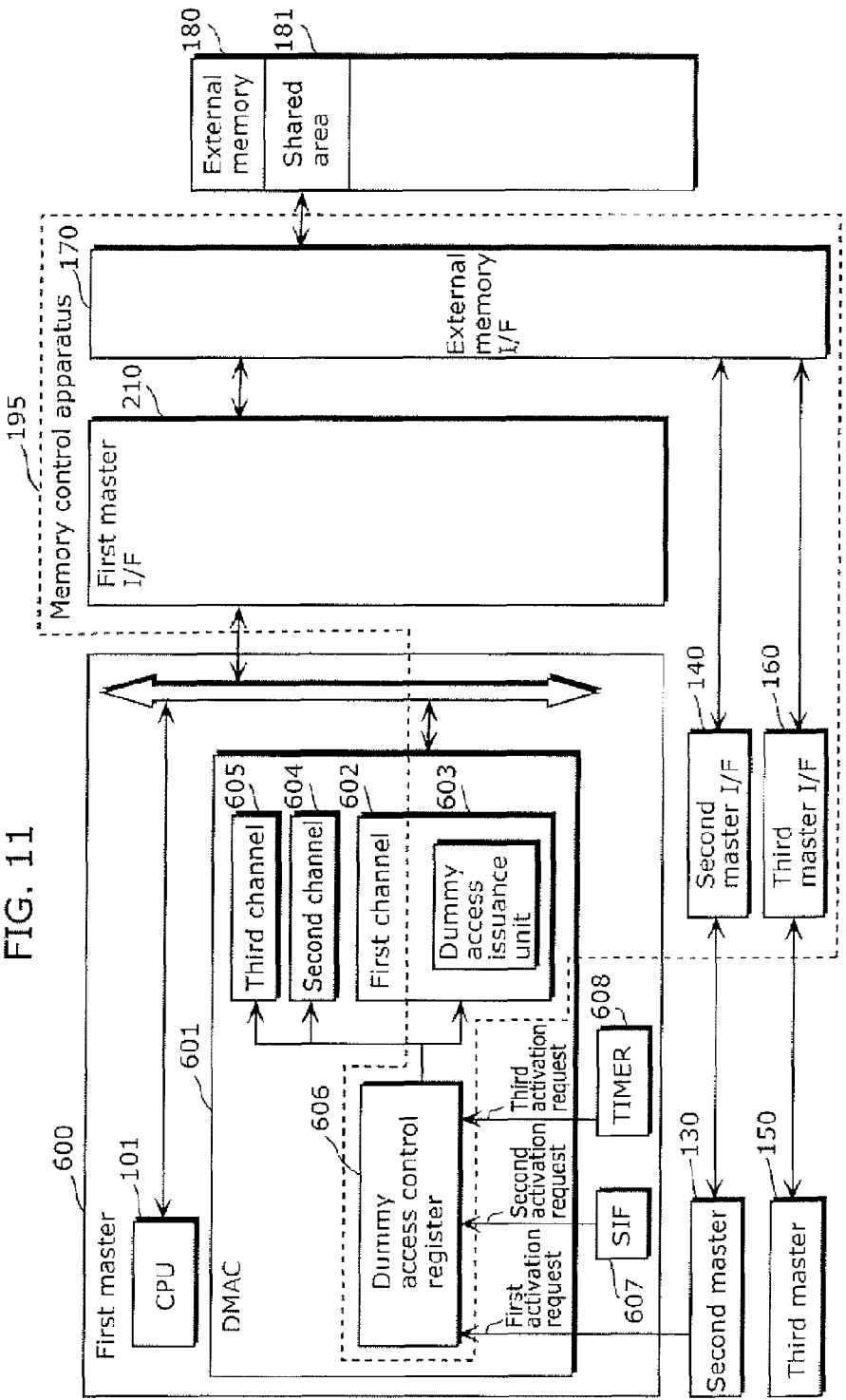
FIG. 11 is a block diagram showing an example of a functional configuration of a memory control apparatus in a sixth embodiment.

FIG. 11 is a block diagram showing an example of a functional configuration of a memory control apparatus 195 in the sixth embodiment. FIG. 11 shows a first master 600, a second master 130, a third master 150 and an external memory 180 in addition to the memory control apparatus 195.

The memory control apparatus 195 includes a dummy access issuance unit 603 which is unique to the channels of a DMAC and a dummy access control register 606 which is shared among the channels, in place of the dummy access issuance unit 402 of the memory control apparatus 193 (refer to FIG. 7) described in the fourth embodiment. The same functional blocks in FIG. 11 as those of the memory control apparatus 193 are provided with the same reference numerals, and they are not described again. In addition, detailed description of the first master I/F 210 are omitted.

The first master 600 is configured with a CPU 101, a DMAC 601, a Serial Interface (SIF) 607 and a TIMER 608. The DMAC 601 is a three-channel DMA controller, and configured with a first channel 602, a second channel 604 and a third channel 605. In addition, as shown in the figure, the dummy access control register is activated in response to a first activation request, a second activation request and a third activation request which respectively correspond to the three types of activation factors; that is, the second master 130, the SIF 607 and the TIMER 608.

The dummy access control register 606 and the dummy access issuance unit 603 shown in the DMAC 601 and the first channel 602 are parts of the memory control apparatus 195.

Upon receiving an activation request from the second master 130, the first channel 602 starts transferring data according to the contents which has been previously set in, for example, a not-shown component register.

The dummy access control register 606 is shared among the first channel 603, the second channel 604 and the third channel 605, and stores a setting value of each of these channels as to whether or not a dummy access is issued ("enable" or "disable") at the time when an activation request is received. These setting values are set on an activation factor basis; that is, the first to third activation requests, and this register is shared among the channels. The dummy access control register 606 outputs the respective set values to the corresponding first to third channels.

When the first to third activation requests are received, the dummy access issuance unit 603 issues a dummy access request equivalent to the dummy access request issued by the earlier-mentioned dummy access issuance unit 402 in the case of one of the received activation requests with respect to which the dummy access control register 606 is set to a value indicating "enable", or prohibits issuance of the dummy access request in the case of one of the received activation requests with respect to which the dummy access control register is set to a value indicating "disable".

Each of the second channel 604 and the third channel 605 is also provided with the same dummy access issuance unit (not shown in a figure).

The second channel 604 and the third channel 605 each is configured similarly to the first channel 602. Upon receiving an activation request among the first to third activation requests, the channel which has received the activation request issues a dummy access request in accordance with the set value of the corresponding dummy access control register 606, and starts transferring the data which has been predetermined.

(Description of Sixth Operation)

Next, an operation example of the sixth embodiment will be described.

Figure 12:
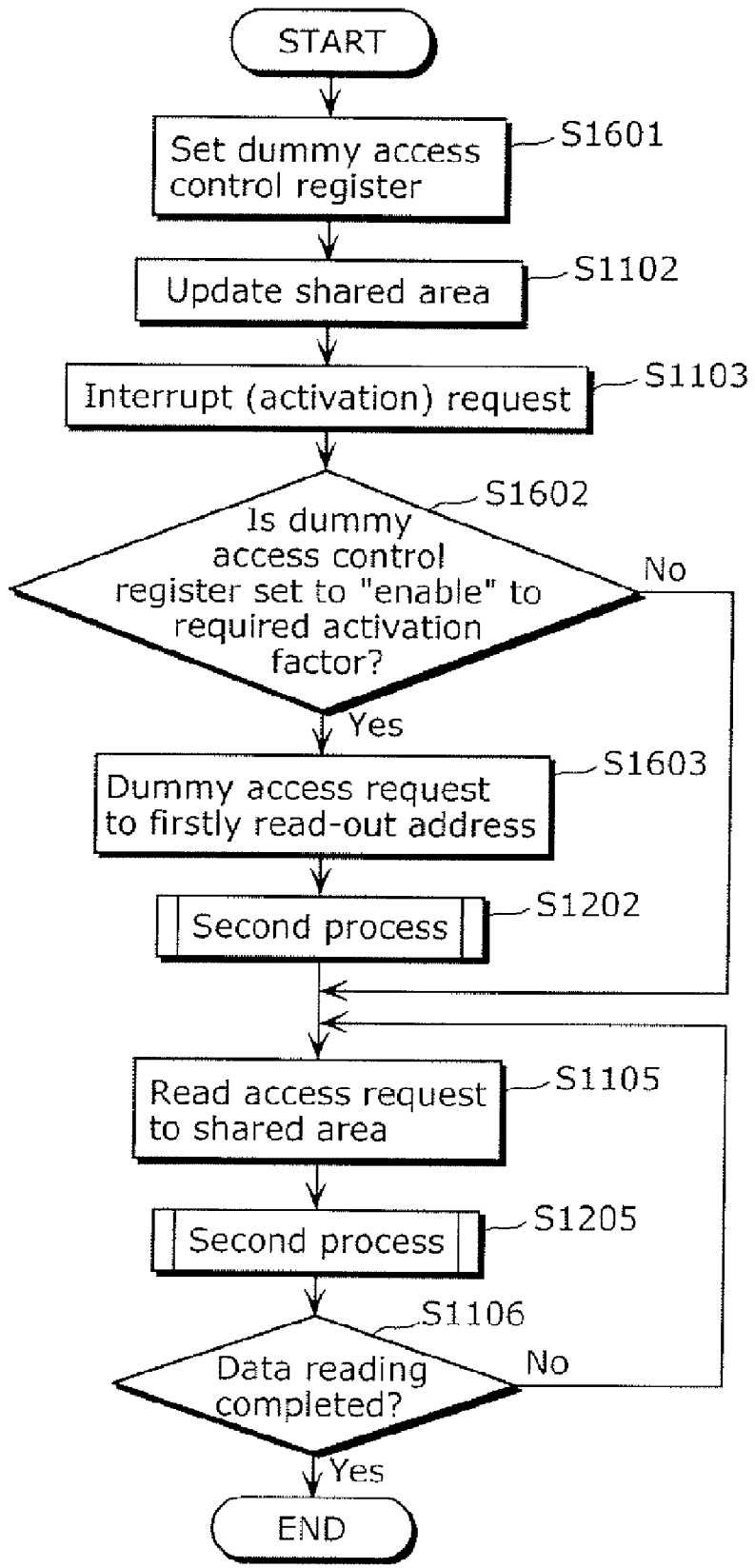
FIG. 12 is a flow chart indicating an operation example of the memory control apparatus in the sixth embodiment.

FIG. 12 is a flow chart indicating the operation example of the memory control apparatus 195 in the sixth embodiment.

The same steps as those of the operation example (refer to FIG. 8) of the memory control apparatus 193 described in the description of the fourth operation are provided with the same reference numerals, and they are not described again. Here, a description is provided assuming that the dummy access issuance unit 603 issues the same dummy access request as the dummy access request issued by the dummy access issuance unit 402.

The CPU 101 sets the value of the dummy access control register 606 as to whether or not it issues a dummy access request on an activation factor basis (Step 1601).

After the shared area 181 on the external memory 180 is updated and the first activation request which is an interrupt request from the second master 130 is received, the first activation request is notified to the channel which has been associated with the first activation request (here, the channel is assumed to be the first channel 602).

Upon receiving the first activation request, the first channel 602 refers to the contents of the dummy access control register 606. In the case where the dummy access control register 606 is set to a value indicating "enable" (Yes in Step 1602), the dummy access issuance unit 603 issues, to the first master I/F 210, a dummy access request for the address of the data to be read out from the shared area 181 for the first time (S1603). In the other case where the dummy access control register 606 is set to a value indicating "disable" (No in Step 1602), it prohibits issuance of the dummy access request.

Subsequently, the first channel 602 of the DMAC 601 accesses the data in the shared area 181 (Step 1105 to Step 1106).

With the above-described configuration, it becomes possible to control issuance of a dummy access at the time when the DMAC is activated on an activation factor basis. This provides an advantage of being able to prohibit issuance of a dummy access at the time when the DMAC is activated in the case where a dummy access is unnecessary for or hazardous to the activation factor.

The section of Description of the Related Art in this specification has pointed out that: a comparatively simple system which does not perform any exclusive control between the masters has the following problem that an identical address is repeatedly read out, repeating a hit of data in a buffer, when a specific master makes a polling access to the specific address in order to detect whether the status of a system on the external memory has been rewritten by another master, resulting in making the data buffer become inconsistent with the external memory; and that the conventional art does not disclose the means to solve the problem.

A configuration desired in order to solve the problem like this is the configuration allowing surely obtaining consistency between a data buffer and an external memory at the time of making, for example, a polling access.

The configuration of a seventh embodiment will be described below.

Seventh Embodiment

Figure 13:
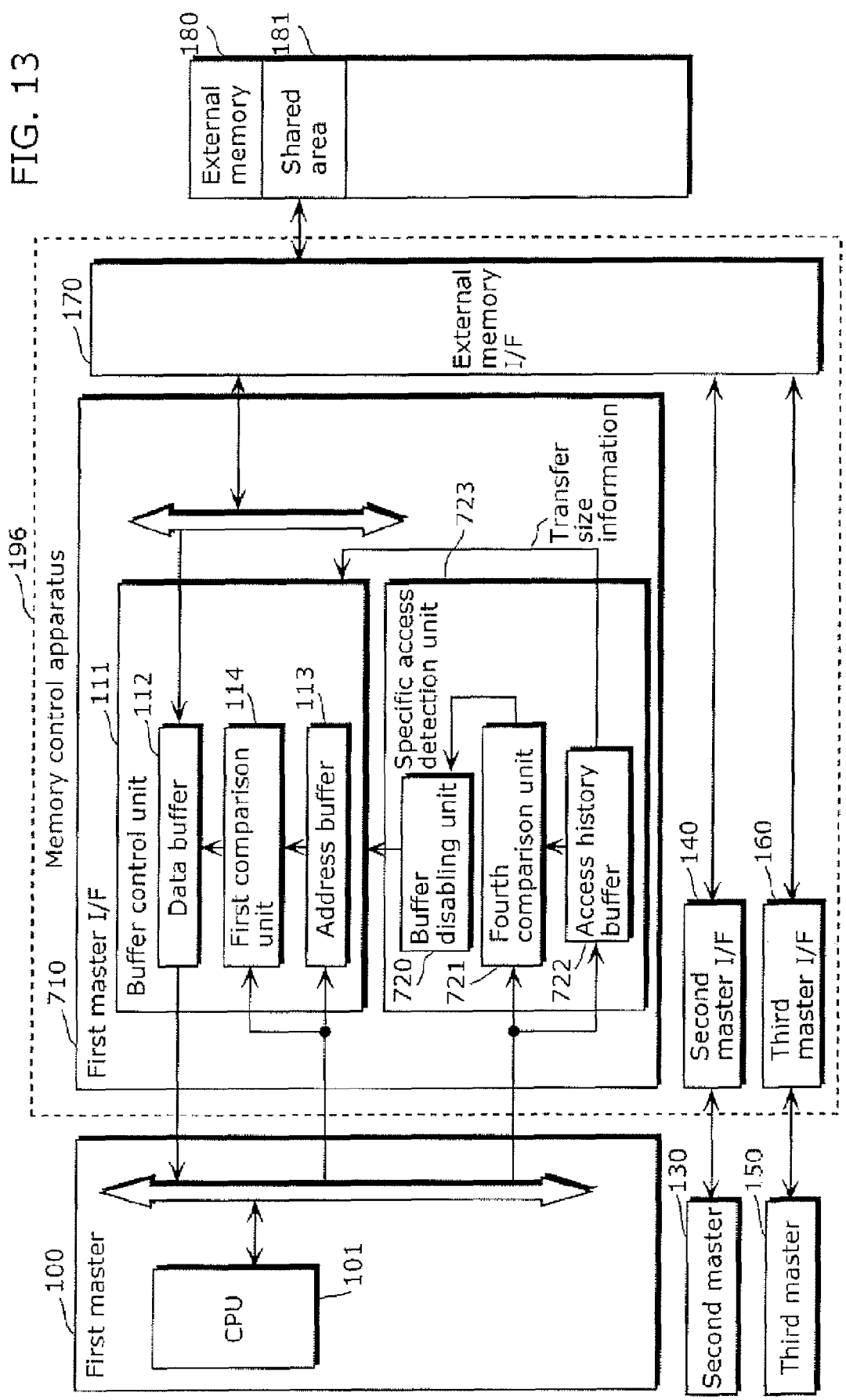
FIG. 13 is a block diagram showing an example of a functional configuration of a memory control apparatus in a seventh embodiment.

FIG. 13 is a block diagram showing an example of a functional configuration of a memory control apparatus 196 in the seventh embodiment. FIG. 13 shows a first master 100, a second master 130, a third master 150 and an external memory 180 in addition to the memory control apparatus 196.

The memory control apparatus 196 is configured by replacing the specific access detection unit 123 in the first master I/F 110 of the memory control apparatus 190 (refer to FIG. 1) described in the first embodiment by a specific access detection unit 723. The same functional blocks as those of the memory control apparatus 190 are provided with the same reference numerals, and they are not described again.

The specific access detection unit 723 is intended for always accessing the external memory 180 in the case of the second or the following access requests when a series of access requests having the same access information occur, and controlling a buffer control unit 111 to disable a buffer. The specific access detection unit 723 is configured with a buffer disabling unit 720, a fourth comparison unit 721 and an access history buffer 722.

Here access information means some or all of the parameters of access requests from the first master 100 and it includes an address, a transfer size, an indication of "read" or "write".

The access history buffer 722 stores access information of the access which was lastly received from the first master 100.

The fourth comparison unit 721 compares the access information of the new access request which has been received from the first master 100 just before with the access information stored in the access history buffer 722, and outputs the fourth information indicating whether or not they match each other to the buffer disabling unit 720.

As for this comparison of access information, it is assumed that the fourth comparison unit 721 always compares addresses and may further compare transfer sizes and distinguish between read and write based on the indication of "read" or "write".

The buffer disabling unit 720 refers to the fourth comparison information using the fourth comparison unit 721 so as to output a disabling control signal to the buffer control unit 111 in the case where the fourth comparison information indicates that the addresses match each other.

When provided with this disabling control signal, the buffer control unit 111 disables the data buffer 112 irrespective of the first comparison information of the first comparison unit 114 and issues an access request to the external memory I/F 170. At this time, as for a transfer size at the time of issuing an access request to the external memory I/F 170, a transfer size shown by access information stored in the access history buffer 722 is used, and the read-out data is outputted to the first master 100 without being stored in the data buffer 112.

(Description of Seventh Operation)

Next, the operation example of the seventh embodiment will be described.

Figure 14:
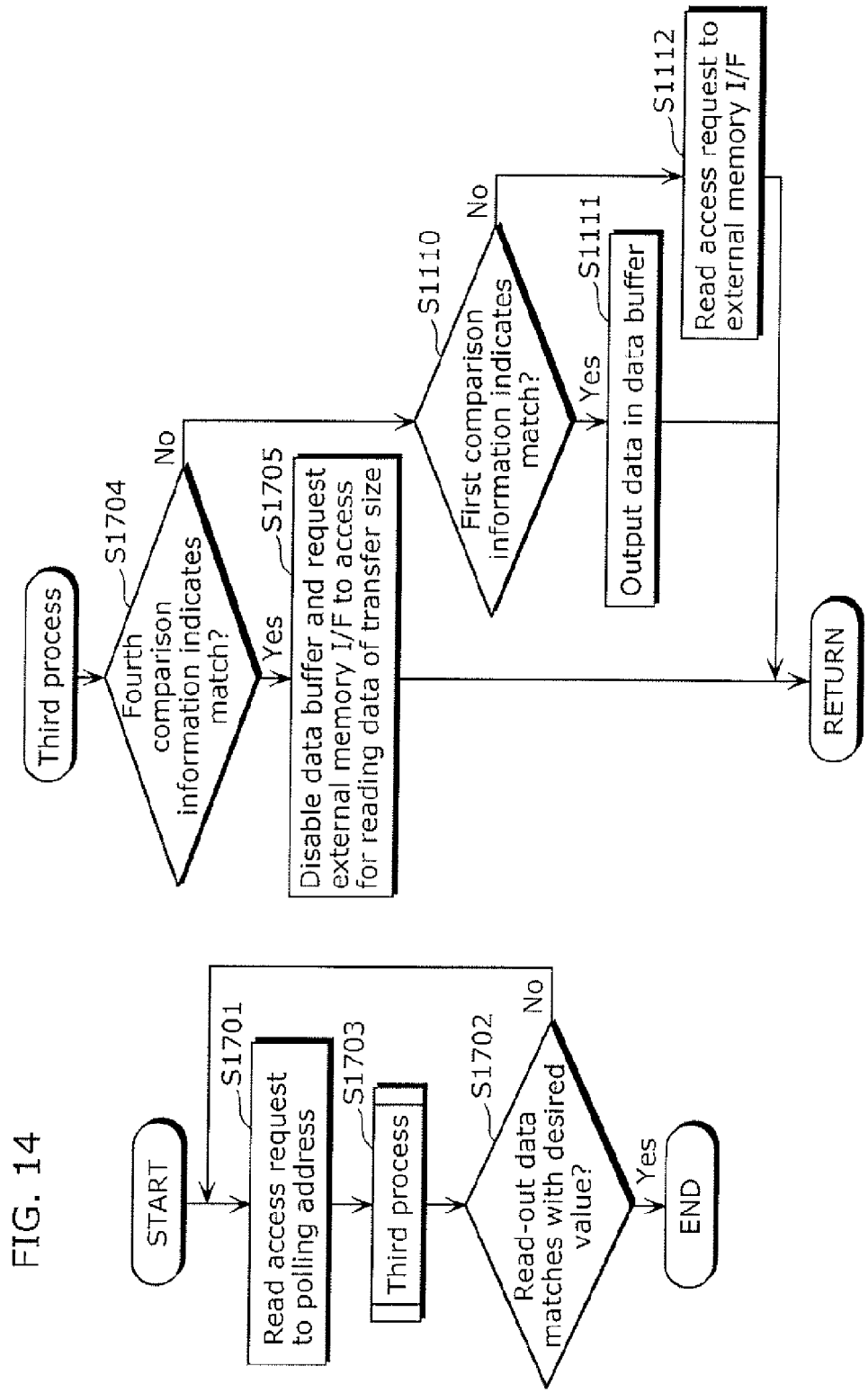
FIG. 14 is a flow chart indicating an operation example of the memory control apparatus in the seventh embodiment.

FIG. 14 is a flow chart indicating the operation example of the memory control apparatus 196 in the seventh embodiment.

The same steps as those of the operation example (refer to FIG. 2) of the memory control apparatus 190 described in the first operation example are provided with the same reference numerals, and they are not described.

The first master 100 issues a read access request in order to detect that the data in a polling address on the external memory 180 has been rewritten to a predetermined desired value (Step 1701). In order to process this read access request, the third process which is a subroutine is called (Step 1703). The third process will be described in detail.

The first master 100 compares the obtained data with the desired value. In the case where they do not match each other (No in Step 1702), it keeps the polling returning to Step 1701. In the other case where they match each other (Yes in Step 1702), it gets out of the polling loop and goes to a predetermined process.

Next, the third process is described. This process is a subroutine process executed by the first master I/F 710.

The butter disabling unit 720 refers to the fourth comparison information of the fourth comparison unit 721 so as to output a disabling control signal to the buffer control unit 111 in the case where the fourth comparison information indicates that the addresses match each other (Yes in Step 1704).

Upon receiving this disabling control signal, the buffer control unit 111 disables the data buffer 112 irrespective of the first comparison information of the first comparison unit 114 and issues an access request for requesting data corresponding to a transfer size referred to by the access history buffer 722 to the external memory I/F 170. The buffer control unit 111 outputs, to the first master 100, the data obtained from the external memory 180 by this access request without storing the data in the data buffer 112 (Step 1705).

In the case where the fourth comparison information indicates that the addresses do not match each other, no disabling control signal is outputted (No in Step 1704), and either the data buffer or the external memory is accessed according to the first comparison information (Step 1110 to Step 1112).

With the above-described configuration, data is read out not from a data buffer but from an external memory in the case where the same access request is repeatedly issued. Therefore, in the case where a specific master makes a polling access to a specific address on an external memory, it is possible to guarantee consistency between the data buffer and the external memory without software care. In addition, an access request is issued for only the necessary data corresponding to a transfer size when reading out the data from the external memory. This provides an advantage of being able to reduce an access load to the external memory.

However, with the configuration of the seventh embodiment, the data buffer is always disabled when the same access request is repeatedly issued. This decreases a future hit rate of the data in the data buffer when the master accesses the external memory, which causes a problem that the access efficiency to the external memory deteriorates.

The configuration that solves the problem will be described below in an eighth embodiment.

Eighth Embodiment

Figure 15:
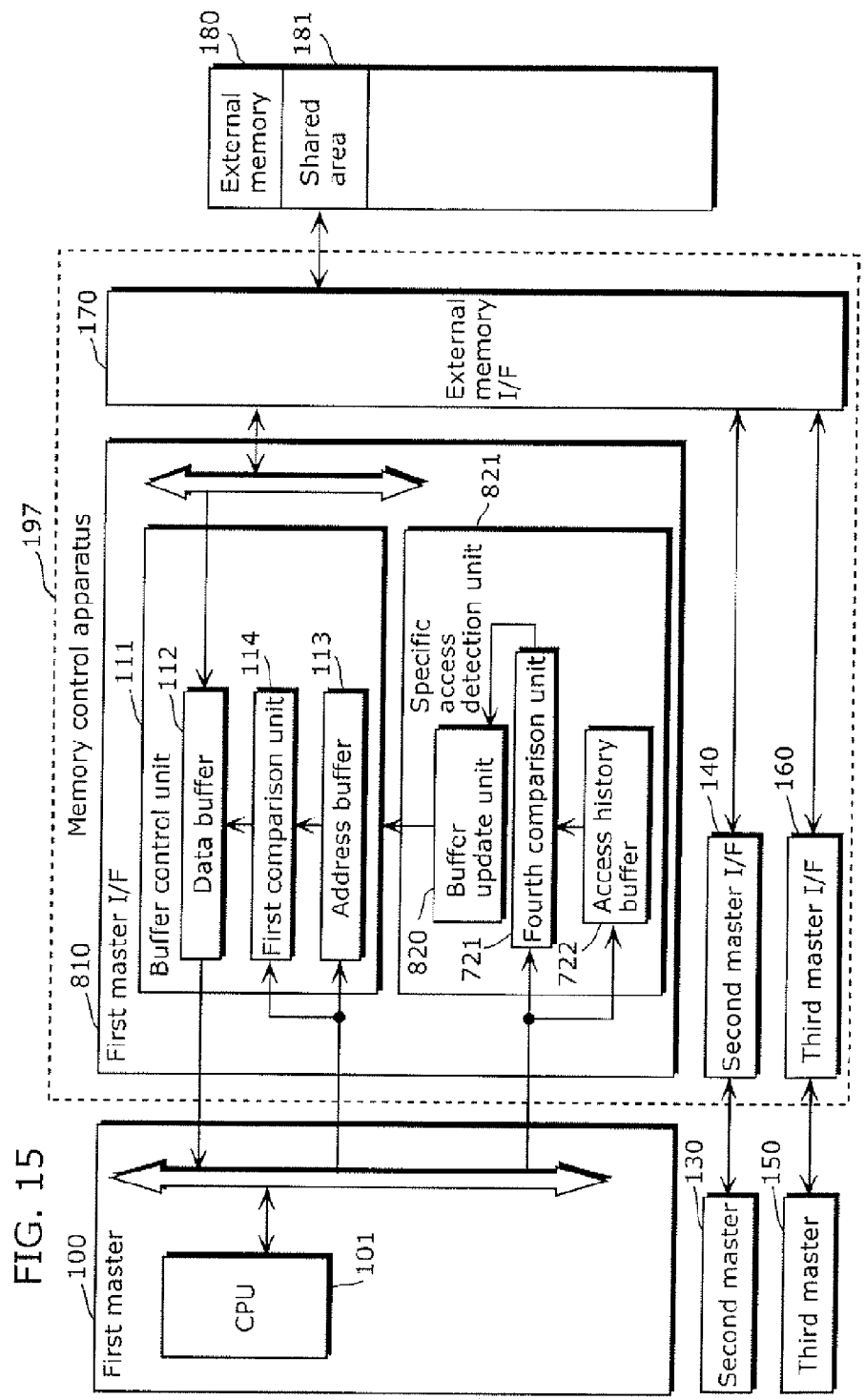
FIG. 15 is a block diagram showing an example of a functional configuration of a memory control apparatus in an eighth embodiment.

FIG. 15 is a block diagram showing an example of a functional configuration of a memory control apparatus 197 in the eighth embodiment. FIG. 15 shows a first master 100, a second master 130, a third master 150 and an external memory 180 in addition to the memory control apparatus 197.

The memory control apparatus 197 is configured by replacing the specific access detection unit 723 in the first master I/F 710 of the memory control apparatus 196 (refer to FIG. 13) described in the seventh embodiment by a specific access detection unit 821. The same functional blocks in FIG. 15 as those of the memory control apparatus 196 are provided with the same reference numerals, and they are not described again.

The specific access detection unit 821 is intended for always accessing the external memory 180 in the case of the second or the following access requests when a series of access requests having the same access information occur, and controlling the buffer control unit 111 to update the contents of the data buffer 112 using the data read out from the external memory 180. The specific access detection unit 821 is configured by replacing the buffer disabling unit 720 of the earlier-described specific access detection unit 723 by a buffer update unit 820.

The buffer update unit 820 refers to the fourth comparison information from the fourth comparison unit 721 so as to output an update control signal to the buffer control unit 111 in the case where the fourth comparison information indicates that the addresses match each other.

Upon being given this update control signal, the buffer control unit 111 issues an access request to the external memory I/F 170 irrespective of the first comparison information of the first comparison unit 114. Subsequently, it outputs the read-out data to the first master 100 and updates the contents of the data buffer 112 using the data.

(Description of Eighth Operation)

Next, the operation example of the eighth embodiment will be described.

Figure 16:
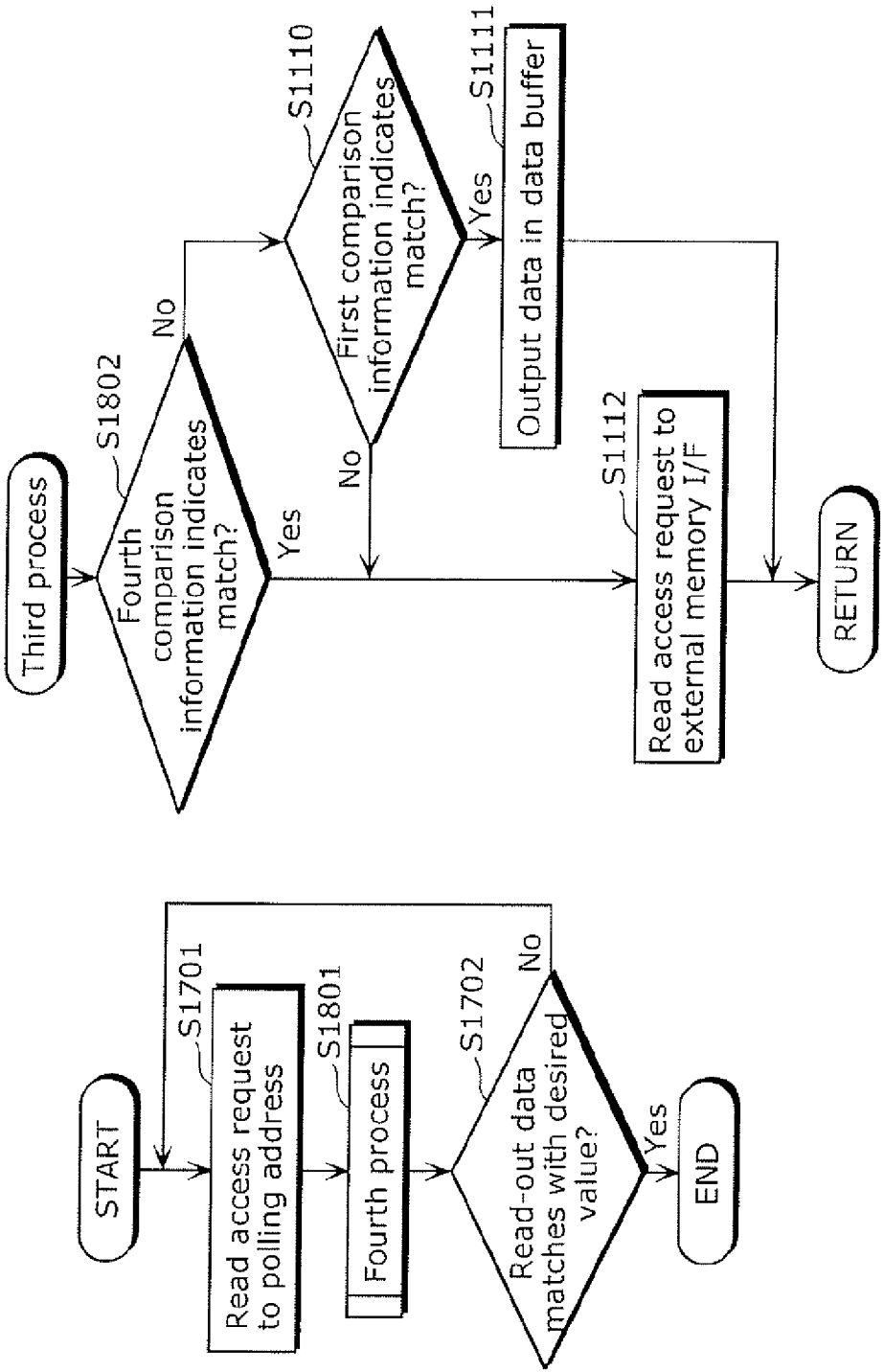
FIG. 16 is a flow chart indicating an operation example of the memory control apparatus in the eighth embodiment.

FIG. 16 is a flow chart indicating an operation example of the memory control apparatus 197 in the eighth embodiment.

The same steps as those of the operation example (refer to FIG. 14) of the memory control apparatus 196 described in the description of the seventh operation are provided with the same reference numerals, and they are not described again.

The first master 100 executes a loop process for issuing a read access request for a polling address (Step 1701 to Step 1702). In order to process the read access request, the fourth process which is a subroutine is called (S1801).

In the fourth process, the buffer update unit 820 refers to the fourth comparison information of the fourth comparison unit 721 so as to output an update control signal to the buffer control unit 111 in the case where the fourth comparison information indicates that the addresses match each other (Yes in Step 1802).

Upon receiving this update control signal, the buffer control unit 111 issues an access request to the external memory I/F 170 irrespective of the first comparison information of the first comparison unit 114 (Step 1112). The buffer control unit 111 stores, in the data buffer 112, the data obtained from the external memory 180 by this access request, and outputs the data to the first master 100.

In the case where the fourth comparison information indicates that the addresses do not match each other, no update control signal is outputted (No in Step 1802), and either the data buffer or the external memory is accessed according to the first comparison information (Step 1110 to Step 1112).

With the above-described configuration, the contents of the data buffer is updated even in the case where the same access request is repeatedly issued. This provides an advantage of being able to prevent a deterioration in a future hit rate of the data in the data buffer when the master accesses an external memory.

However, with each of the configurations of the seventh embodiment and the eighth embodiment, an access request to an external memory occurs each time a polling access is made. This causes a problem that access latency from the CPU increases and an access load to the external memory I/F increases unnecessarily.

The configuration that solves the problem will be described below in a ninth embodiment.

Ninth Embodiment

Figure 17:
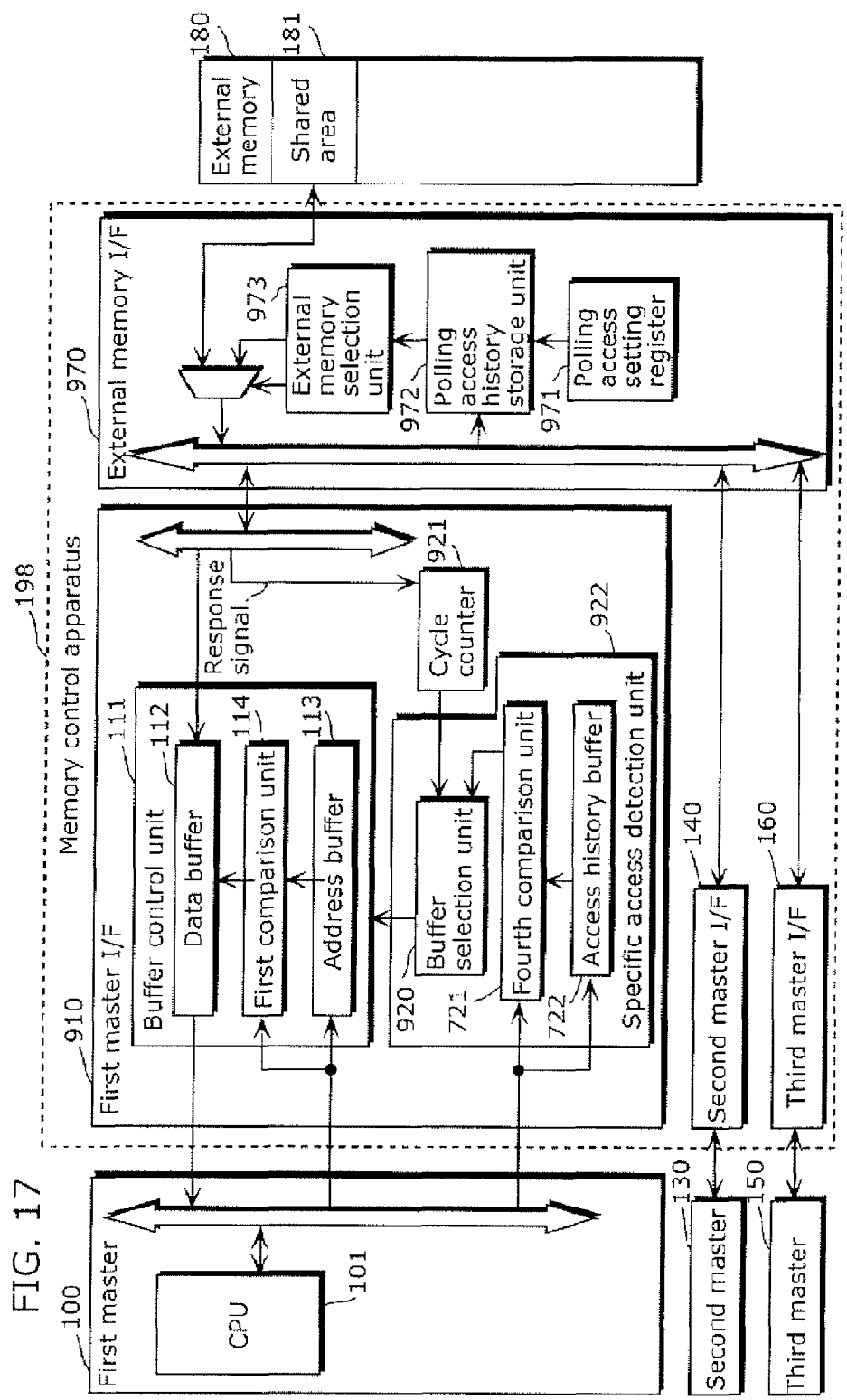
FIG. 17 is a block diagram showing an example of a functional configuration of a memory control apparatus in a ninth embodiment.

FIG. 17 is a block diagram showing an example of a functional configuration of a memory control apparatus 198 in the ninth embodiment. FIG. 17 shows a first master 100, a second master 130, a third master 150 and an external memory 180 in addition to the memory control apparatus 198.

The memory control apparatus 196 is configured by replacing the respective first master I/F 810 and external memory I/F 170 of the memory control apparatus 197 (refer to FIG. 15) described in the eighth embodiment by the first master I/F 910 and the external memory I/F 970. The same functional blocks in FIG. 17 as those of the memory control apparatus 197 are provided with the same reference numerals, and they are not described.

The first master I/F 910 has an additional function of outputting the contents of the data buffer 112 to the first master 100 in the case where a response from the external memory I/F 970 is made earlier compared to the case of accessing the external memory 180. It is configured by adding a specific access unit 922 and a cycle counter 921 to the first master I/F 810. The specific access unit 922 is obtained by replacing, by a buffer selection unit 920, the buffer update unit 820 in the specific access detection unit 821 of the first master I/F 810.

Compared to the external memory I/F 170, the external memory I/F 970 is intended for having an additional function of managing presence/absence of data update in a polling address, and making a quick response, without accessing the external memory 180, in response to the access request for the polling address from the first master I/F 910, in the case where the data has not been updated. It is configured by adding, to the external memory I/F 170, a polling address setting register 971, a polling access history storage unit 972 and an external memory selection unit 973

Each of the units in the first master I/F 910 has the following detailed function.

The buffer selection unit 920 includes the same function as that of the buffer update unit 820. When an access request is issued from the first master 100, it refers to the fourth comparison information from the fourth comparison unit 721 so as to output an update control signal to the buffer control unit 111 in the case where the fourth comparison information indicates that the addresses match each other.

Upon being given this update control signal, the buffer control unit 111 issues an access request to the external memory I/F 170 irrespective of the first comparison information of the first comparison unit 114.

The cycle counter 921 measures the number of cycles of steps from the step where the buffer control unit 111 issues an access request to the external memory I/F 970 to the step where an access response signal is returned, and notifies the measured number of cycles to the buffer selection unit 920.

In the case where the notified number of cycles is no more than a predetermined number of cycles, the buffer selection unit 920 outputs a first selection control signal to the buffer control unit 111. In the other case where the notified number of cycles is greater than the predetermined number of cycles, it outputs a second selection control signal to the buffer control unit 111.

Upon being given the first selection control signal, the buffer control unit 111 outputs the data in the data buffer 112 to the first master 100. In the other case where the buffer control unit 111 is given the second selection control signal, it outputs the data returned from the external memory I/F 970 to the first master 100, and stores the data in the data buffer 112.

In addition, each of the units in the external memory I/F 970 has the following detailed function.

The polling address setting register 971 stores a polling address, on the external memory 180, which has been arbitrarily set by each of the masters to be used for a polling address.

The polling access history storage unit 972 stores a status value indicating consistency/inconsistency between the data buffer 112 and the external memory 180. Here are specific examples for this. This status value may be reset to "0" when receiving a write access request for the polling address which has been set in the polling address setting register 971 from one of the first master I/F 910, the second mater I/F 140, and the third master I/F 160. This status value may be set to "1" when receiving a read access request for the polling address from the first master I/F 910. This status value may be reset to "0" when receiving a read access request for an address other than the polling address from the first master I/F 910.

Here, the status value "1" indicates a consistent status where the present data in the polling address of the external memory 180 is also stored in the data buffer 112. The status value "0" indicates an inconsistent status where the data in the external memory 180 has been rewritten or data in an address other than the polling address has stored in the data buffer 112.

When a read access request for the polling address is made by the first master I/F 910, the external memory selection unit 973 accesses the external memory 180 and returns the obtained data to the first master I/F 910 in the case where the contents of the polling access history storage unit 972 is the status value "0", and in the other case where the contents of the polling access history storage unit 972 is the status value "1", it skips an access to the external memory 180 and immediately returns a response signal to the first master I/F 910 within a time shorter than the time required in the case of accessing the external memory 180.

(Description of Ninth Operation)

Next, the operation example of the ninth embodiment will be described.

Figure 18:
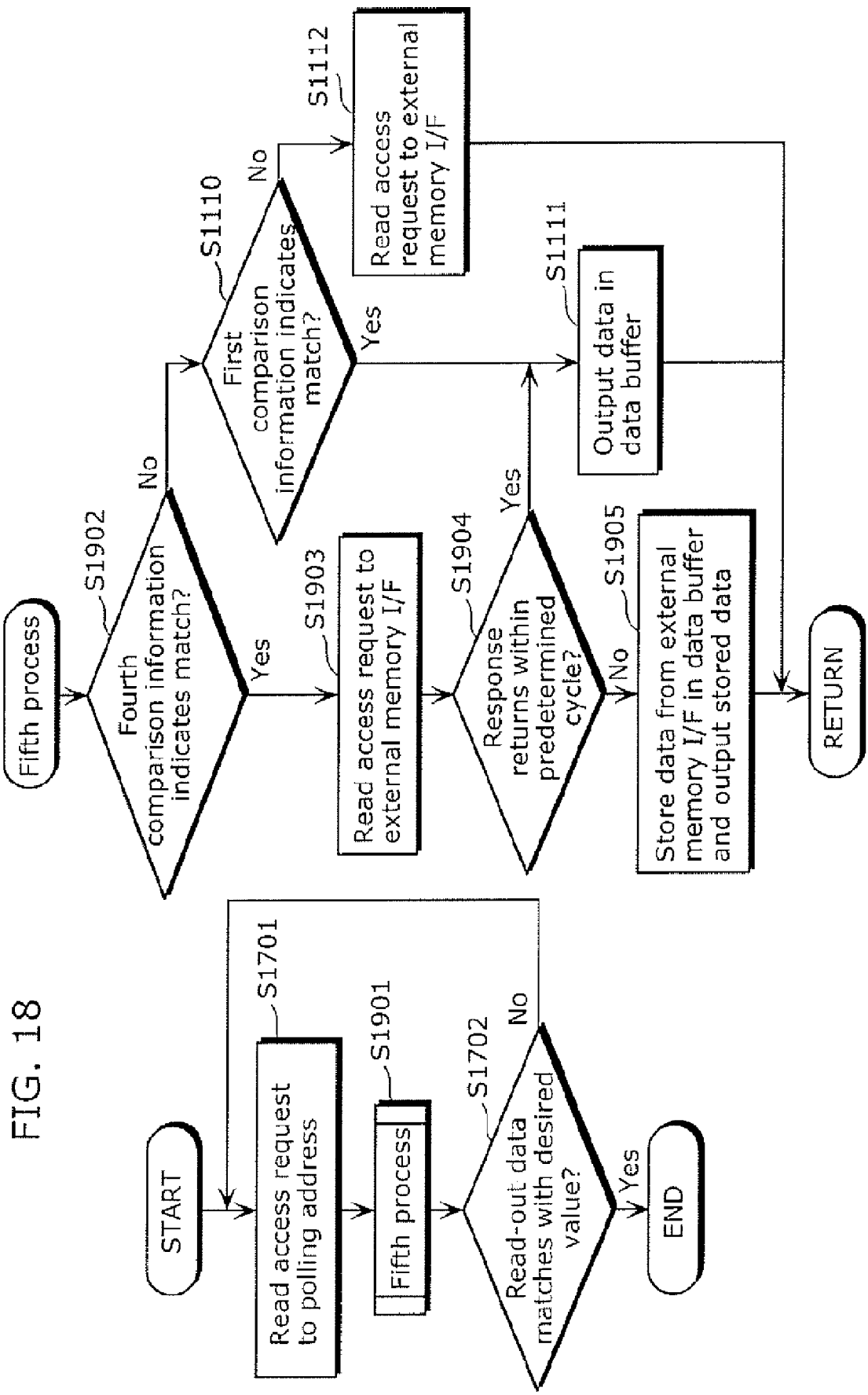
FIG. 18 is a flow chart indicating an operation example of the memory control apparatus in the ninth embodiment.

FIG. 18 is a flow chart indicating the operation example of the memory control apparatus 198 in the ninth embodiment.

The same steps as those of the operation example (refer to FIG. 16) of the memory control apparatus 197 described in the description of the eighth operation are provided with the same reference numerals, and they are not described again.

The first master 100 executes the loop process for issuing a read access request for a polling address (Step 1701 to Step 1702). In order to process the read access request, the fifth process which is a subroutine is called (Step 1901).

In the fifth process, the buffer selection unit 920 refers to the fourth comparison information of the fourth comparison unit 721 so as to output an update control signal to the buffer control unit 111 in the case where the fourth comparison information indicates that the addresses match each other (Yes in Step 1902).

Upon receiving this update control signal, the buffer control unit 111 issues an access request to the external memory I/F 970 irrespective of the first comparison information of the first comparison unit 114 (Step 1903). When this access request is issued, the cycle counter 921 starts measuring the number of cycles.

Upon receiving this access request, the external memory I/F 970 performs one of the followings as described above depending on the status value stored in the polling access history storage unit 972: immediately returning an access response signal; and accessing the external memory 180 so as to obtain the latest data in the polling address and returning the data and the access response signal to the first master I/F 910.

When the access response signal is returned from the external memory I/F 970, the cycle counter 921 notifies the buffer selection unit 920 of the number of cycles which has been measured so far.

In the case where the notified number of cycles is no more than a predetermined cycle (Yes in Step 1904), the buffer selection unit 920 outputs a first selection control signal to the buffer control unit 111. Upon receiving this first selection control signal, the buffer control unit 111 outputs the data of the data buffer 112 to the first master 100 (Step 1111).

In the other case where the notified number or cycles is greater then the predetermined number of cycles (No in Step 1904), the buffer selection unit 920 outputs a second selection control signal to the buffer control unit 111. Upon receiving this second selection control signal, the buffer control unit 111 outputs the data returned from the external memory I/F 170 to the first master 100, and stores the data in the data buffer 112 (Step 1905).

Note that the earlier-mentioned update control signal is not outputted in the case where the fourth comparison information indicates that the addresses do not match each other (No in Step 1902). In accordance with the first comparison information, either the data buffer or the external memory is accessed (Step 1110 to Step 1112).

With the above-described configuration, it becomes possible to obtain an advantage of eliminating allowing an access request to occur each time a polling access is made. This provides an advantage of controlling access latency from the CPU and reducing an access load to the external memory.

In addition, since the external memory I/F has a polling address setting register, a polling access history storage unit and an external memory selection unit, it becomes possible to always reuse the data of the data buffer, at the time when the external memory I/F makes a response at an early cycle. This also provides an advantage of reducing access latency from the CPU.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

The memory control apparatus according to the present invention has plural masters which share an external memory. In a system where data is exchanged between these masters, the memory control apparatus has a configuration which guarantees data consistency between the external memory and the data buffer inside a master interface corresponding to each master. Therefore, the memory control apparatus is useful as a system LSI to be mounted on a DVD recorder.

What is claimed is:

1. A memory control apparatus which performs data transfer between a master and an external memory, said apparatus comprising:
   a master interface operable to receive an access request from the master and issue the access request to the external memory; and
   an external memory interface operable to receive the access request from said master interface and access the external memory,
   wherein said master interface includes:
   a data buffer operable to store data transferred from said external memory interface when the access request is issued;
   an address buffer operable to store an address for which the access request has been issued;
   a first comparison unit operable to compare a new address for which the access request has newly been issued with the address stored in said address buffer, and output first comparison information indicating whether or not the new address matches the address stored in said address buffer which indicates an address range of data stored in said data buffer;
   a buffer control unit operable to issue an access request to said external memory interface, in the case where the first comparison information indicates a mismatch between the new address and the stored address, and operable to output data from said data buffer to the master without issuing an access request to said external memory interface, in the case where the first comparison information indicates a match between the new address and the stored address; and a specific access detection unit operable to detect a new access request made by the master to a specific address on the external memory and determine, irrespective of whether the first comparison information indicates the match or the mismatch, whether or not to issue an access request to said external memory interface so as to control said buffer control unit based on the determination.

2. The memory control apparatus according to claim 1, wherein said specific access detection unit includes:

a second comparison unit operable to compare the new address with the specific address on the external memory, and output, to said buffer control unit, second comparison information indicating whether or not the new address matches the specific address; and a buffer disabling unit operable to disable a content of said address buffer and control said buffer control unit to make a dummy response to the access request, in the case where the second comparison information indicates a match between the new address and the specific address.

3. The memory control apparatus according to claim 2, wherein the specific address is included in a specific area, on the external memory, where an access from the master is prohibited because the specific address is used by said external memory interface during access control.

4. The memory control apparatus according to claim 2, wherein said specific access detection unit further includes a specific address setting register where a specific address can be arbitrarily set.

5. The memory control apparatus according to claim 2, further comprising a dummy access issuance unit operable to receive a notification indicating that shared data on the external memory has been updated, and issue, to said master interface, the access request the specific address.

6. The memory control apparatus according to claim 1, wherein said specific access detection unit is operable to control said buffer control unit to forcibly issue or prohibit issuance of an access request to the external memory interface, depending on the comparison between the new address and an address in access history and irrespective of whether the first comparison information indicates the match or the mismatch.

7. The memory control apparatus according to claim 6, wherein said specific access detection unit includes:

a buffer access history storage unit operable to store history information indicating whether the master accessed the external memory interface or the master accessed said data buffer;

a third comparison unit operable to compare the new address with the address stored in said address buffer, and output, to said buffer update unit, the third comparison information indicating whether or not the new address completely matches the stored address; and a buffer update unit operable to control said buffer control unit to forcibly issue an access request to the external memory interface, in the case where the third comparison information indicates a match between the new address and the stored address and the history information of said buffer access history storage unit indicates an access to said data buffer.

8. The memory control apparatus according to claim 7, further comprising a dummy access issuance unit operable to receive a notification indicating that shared data on the external memory has been updated, and issue, to said master interface an access request for an address stored in said address buffer.

9. The memory control apparatus according to one of claim 5 and claim 8, wherein the master is a Direct Memory Access (DMA) controller, the notification indicates an activation request for activating the DMA controller, and said dummy access issuance unit is operable to control the DMA controller to start data transfer after the access request is issued at the time of receiving the notification.

10. The memory control apparatus according to claim 9, wherein the DMA controller includes a plurality of channels, the notification indicates an activation request for activating one of the plurality of channels, said memory control apparatus further comprises a dummy access control register where a value indicating "enable" or "disable" is set on a channel basis, and said dummy access issuance unit is operable to prohibit issuance of the access request, in the case where the value set in said dummy access control register indicates "disable" with respect to the channel to which the activation request has been issued by the notification.

11. The memory control apparatus according to claim 9, wherein the DMA controller includes a plurality of channels, the notification indicates an activation request for activating one of the plurality of channels and an activation factor of the activation request, said memory control apparatus further comprises a dummy access control register where a value indicating "enable" or "disable" is set on an activation factor basis, said dummy access control register being shared among the channels, and said dummy access issuance unit is operable to prohibit issuance of the access request, in the case where the value set in said dummy access control register indicates "disable" with respect to the activation factor indicated by the notification.

12. The memory control apparatus according to claim 6, wherein said specific access detection unit includes:

an access history buffer operable to store access information including at least the address in the access history;

a fourth comparison unit operable to compare new access information, which includes at least the new address for which the new access request has been issued, with the access information stored in said access history buffer, and output the fourth comparison information indicating whether or not an identical access has been repeated; and a buffer disabling unit operable to control said buffer control unit to forcibly issue an access request to said external memory interface, in the case where the fourth comparison information indicates that the identical access has been repeated.

13. The memory control apparatus according to claim 12, wherein, when said buffer disabling unit controls said buffer control unit to issue an access request to said external memory interface, said buffer disabling unit is operable to control said buffer control unit to issue an access request for requesting data corresponding to a request size indicated by the new access request, in the case where the fourth comparison information indicates that the access has been repeated, and said buffer disabling unit is operable to control said buffer control unit to issue an access request for requesting data corresponding to a size of said data buffer, in the case where the fourth comparison information indicates that no identical access has been repeated.

14. The memory control apparatus according to claim 12, further comprising a buffer update unit operable to update a content of said data buffer using data read out from said external memory interface, in the case where the fourth comparison information indicates that the identical access has been repeated.

15. The memory control apparatus according to claim 14, wherein said external memory interface includes:

a polling address setting register where an address on the external memory can be arbitrarily set;

a polling access history storage unit operable to be set triggered by a read access and be reset triggered by a write access, the read access and the write access being made to the address which has been set in said polling address setting register; and an external memory selection unit operable to prohibit an access to the external memory and make a response to said master interface within a time which is short compared to a time required in the case of accessing the external memory, in the case where said polling access history storage unit has been set by the time when said master interface makes a read access request for the address set in said polling address setting register, and said specific access detection unit further includes a buffer selection unit operable to control said buffer control unit to output data stored in said data buffer to the master, in the case where said external memory interface makes the response within a predetermined time period.

16. The memory control apparatus according to claim 15, wherein said polling access history storage unit is operable to be reset triggered by a read access which said master interface makes to an address other than the polling address.

17. A memory control method for performing data transfer between a master and an external memory, using a memory control apparatus which includes:

a master interface which receives an access request from the master and issue the access request to the external memory; and an external memory interface operable to receive the access request from the master interface and access the external memory, wherein the master interface includes:

a data buffer which stores data transferred from the external memory interface when the access request is issued; and an address buffer which stores an address for which the access request has been issued, and wherein said memory control method comprises:

comparing a new address for which the access request has newly been issued with the address stored in the address buffer, and outputting first comparison information indicating whether or not the new address matches the address stored in said address buffer which indicates an address range of data stored in the data buffer;

issuing an access request to the external memory interface, in the case where the first comparison information indicates a mismatch between the new address and the stored address, and outputting data from the data buffer to the master without issuing an access request to the external memory interface, in the case where the first comparison information indicates a match between the new address and the stored address; and detecting a new access request made by the master to a specific address on the external memory and determining, irrespective of whether the first comparison information indicates the match or the mismatch, whether or not to issue an access request to the external memory interface so as to control the buffer control unit based on the determination.

* * * * *